US008003965B2

(12) United States Patent
Grbic et al.

(10) Patent No.: US 8,003,965 B2
(45) Date of Patent: Aug. 23, 2011

(54) APPARATUS FOR SUB-WAVELENGTH NEAR-FIELD FOCUSING OF ELECTROMAGNETIC WAVES

(75) Inventors: Anthony Grbic, Ann Arbor, MI (US); Roberto D. Merlin, Ann Arbor, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 436 days.

(21) Appl. No.: 12/123,434

(22) Filed: May 19, 2008

(65) Prior Publication Data
US 2009/0303154 A1 Dec. 10, 2009

Related U.S. Application Data

(60) Provisional application No. 60/938,858, filed on May 18, 2007.

(51) Int. Cl.
 *G21K 1/00* (2006.01)
 *G02B 3/00* (2006.01)
(52) U.S. Cl. .............. 250/505.1; 977/701; 977/707; 343/909; 359/642
(58) Field of Classification Search .................. None
 See application file for complete search history.

(56) References Cited

U.S. PATENT DOCUMENTS

| | | | |
|---|---|---|---|
| 4,595,899 A | 6/1986 | Smith et al. | |
| 4,955,692 A | 9/1990 | Merlin et al. | |
| 6,859,114 B2 | 2/2005 | Eleftheriades et al. | |
| 7,777,594 B2 | 8/2010 | Eleftheriades | |
| 2006/0192115 A1 | 8/2006 | Thomas et al. | |
| 2009/0230333 A1 | 9/2009 | Eleftheriades | |

FOREIGN PATENT DOCUMENTS

EP 0 660 370 6/1995

OTHER PUBLICATIONS

Fang et al., "Sub-Diffraction-Limited Optical Imaging With a Silver Superlens" Science 308:534-537 (2005).
Grbic et al., "Overcoming the Diffraction Limit with a Planar Left-Handed Transmission-Line Lens," Phys. Rev. Lett. 92:117403-01-117403-4 (2004).
Grbic et al., "Practical Limitations of Subwavelength Resolution Using Negative-Refractive-Index Transmission-Line Lenses," IEEE Trans. on Antennas and Propagation, 53(10):3201-3209 (2005).
International Search Report from PCT/US08/64173 dated Jul. 25, 2008.

(Continued)

*Primary Examiner* — Trinh V Dinh
(74) *Attorney, Agent, or Firm* — Marshall, Gerstein & Borun LLP

(57) ABSTRACT

Planar sub-wavelength structures provide superlensing, i.e., electromagnetic focusing beyond the diffraction limit. The planar structures use diffraction to force the input field to converge to a spot on the focal plane. The sub-wavelength patterned structures manipulate the output wave in such a manner as to form a sub-wavelength focus in the near field. In some examples, the sub-wavelength structures may be linear grating-like structures that can focus electromagnetic radiation to lines of arbitrarily small sub-wavelength dimension, or two dimensional grating-like structures and Bessel (azimuthally symmetric) structures that can focus to spots of arbitrarily small sub-wavelength dimensions. The particular pattern for the sub-wavelength structures may be derived from the desired focus. Some examples describe sub-wavelength structures that have been implemented to focus microwave radiation to sub-wavelength dimensions in the near field.

35 Claims, 15 Drawing Sheets

OTHER PUBLICATIONS

Kurs et al., "Wireless Power Transfer via Strongly Coupled Magnetic Resonances," Science, 317:83-85 (2007).

Melville et al., "Super-Resolution Imaging Through a Planar Silver Layer," Optics Express, 13(6):2127-2134 (2005).

Merlin, "Analytical Solution of the Almost-Perfect-Lens Problem," Appl. Phys. Lett. 84:1290-1292 (2004).

Merlin, "Radiationless Electromagnetic Interference: Evanescent-Field Lenses and Perfect Focusing," Science, 317:927-929 (2007).

Mesa et al., "Three-Dimensional Superresolution in Metamaterial Slab Lenses: Experiment and Theroy," Physical Review B, 72:235117-1-235117-6 (2005).

Milton et al., "A proof of superlensing in the quasistatic regime, and limitations of superlenses in this regime due to anomalous localized resonance" Proc. Royal Soc. A, 461:3999-4034 (2005).

Pendry, "Negative Refraction makes a Perfect Lens," Phys. Rev. Lett. 85:3966-3969 (2000).

Shelby et al., "Experimental Verification of a Negative Index of Refraction" Science 292:77-79 (2001).

Smith et al., "Limitations on Subdiffraction Imaging with a Negative Refractive Index Slab," Applied Physics Letters, 82:1506-1508 (2003).

Written Opinion from PCT/US08/64173 dated Jul. 25, 2008.

Grbic, et al., "Near-Field Focusing Plates and Their Design," IEEE Transactions on Antennas and Propagation, 56(10):3159-3165 (2008).

Grbic, et al., "Near-Field Plates: Subdiffraction Focusing with Patterned Surfaces," Science 320:511-513 (2008).

Wong, et al., "Metallic transmission screen for sub-wavelength focusing," Electronics Letters, 43(25):2 pages (2007).

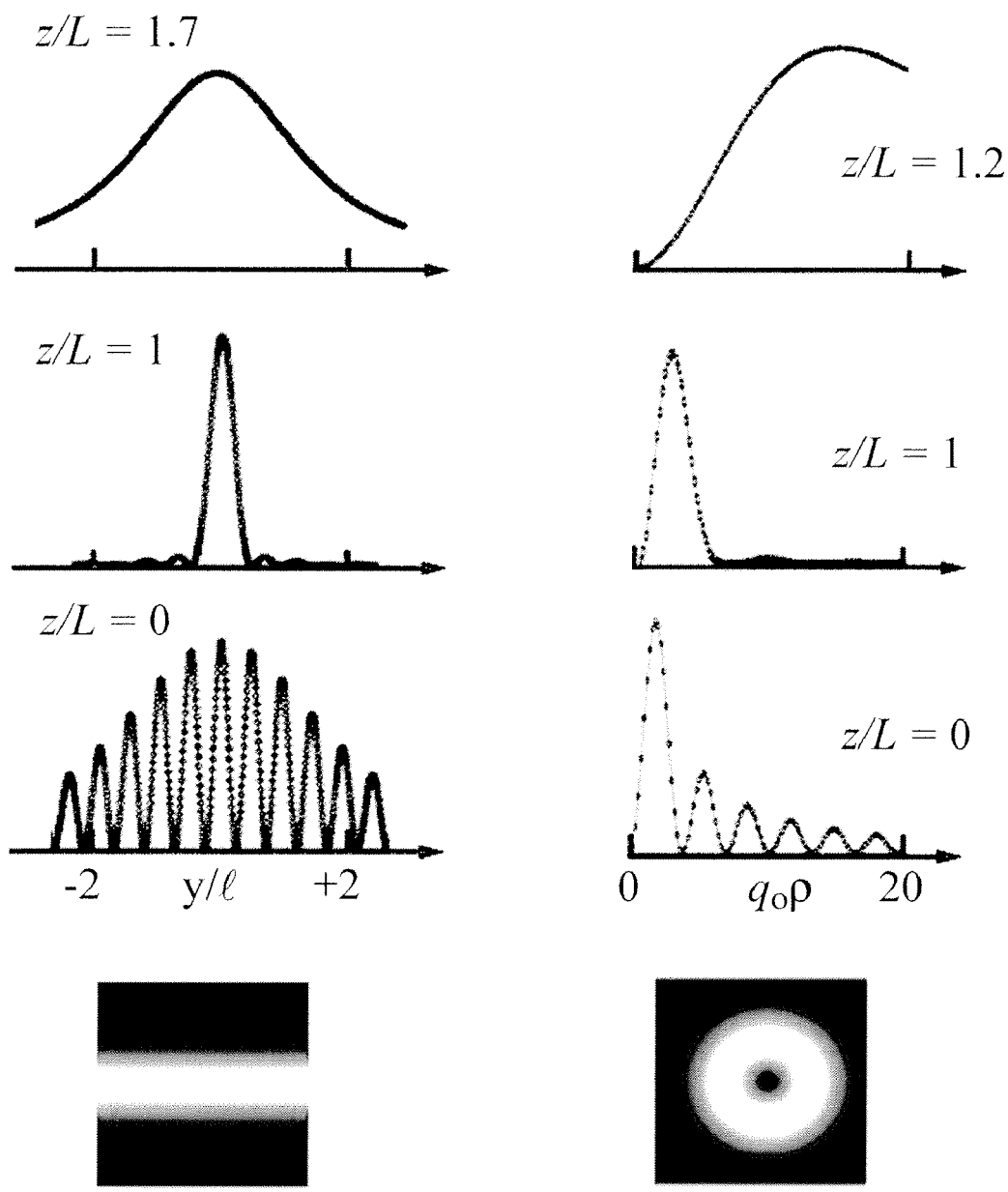
FIG. 1A  FIG. 1B

FIG. 2B
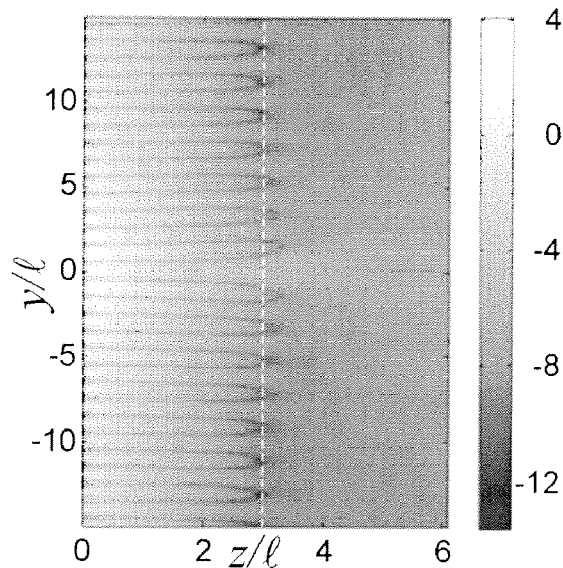
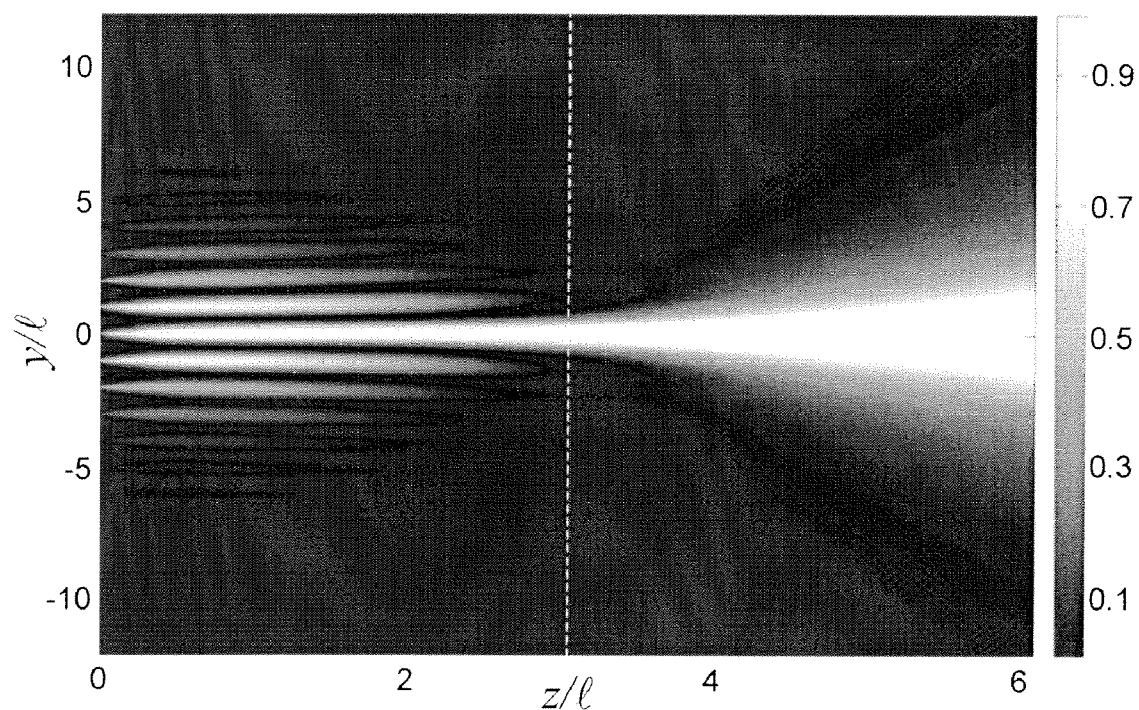
FIG. 2C

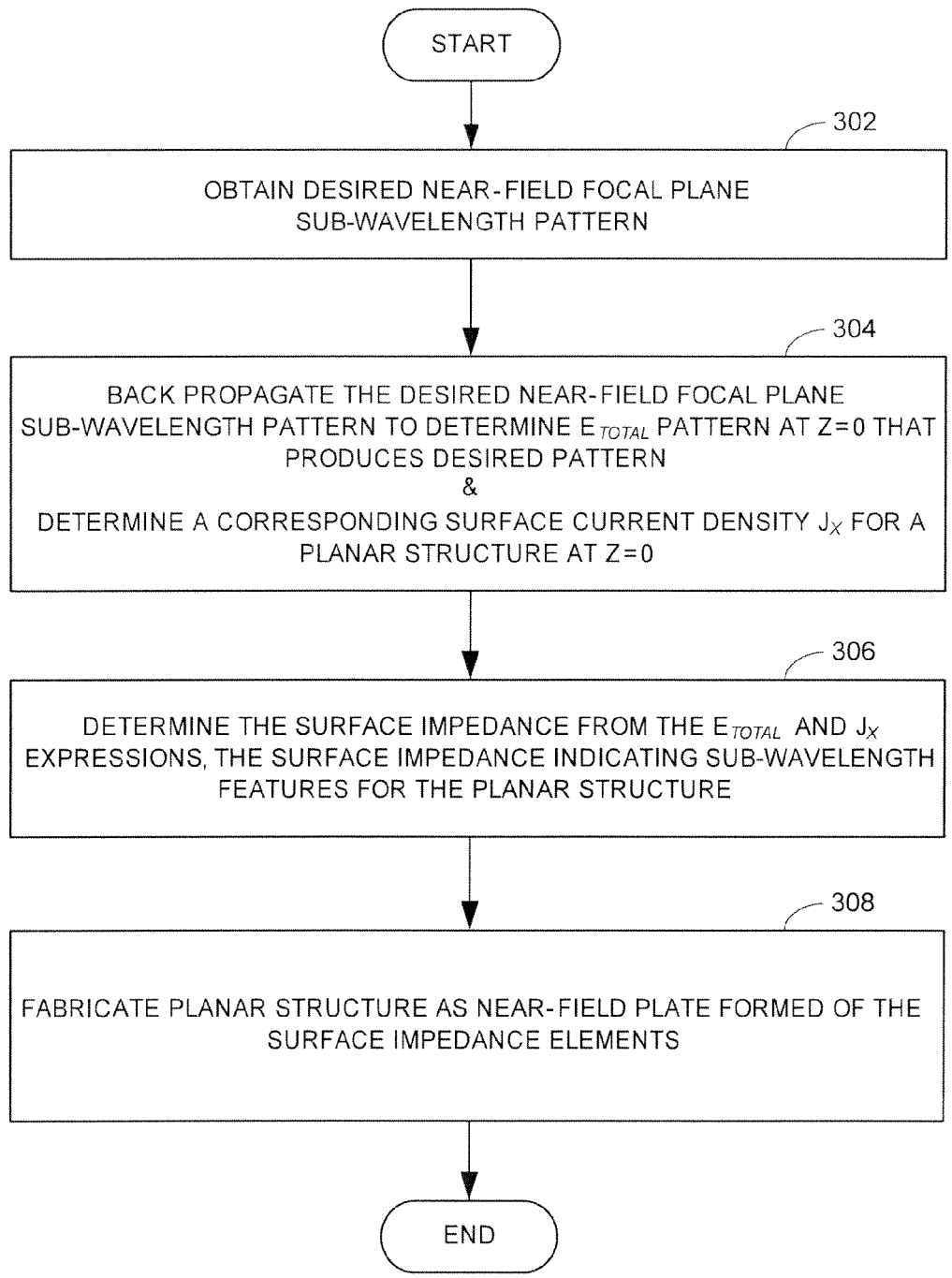

Back-Propagation

$$E_x(y, z = L) \approx e^{-q_0^L} q_0 L \text{sinc}(q_0 y)$$

$$E_{total}(y) = E_x(y, z=0) \approx \frac{L[L\cos(q_0 y) + y\sin(q_0 y)]}{L^2 + y^2}$$

Integral Equation to find $J_x(y)$

$$E_{total}(y) = E_x(y, z=0) = E_{inc} - \frac{k_o \eta}{4} \int_{-W/2}^{W/2} J_x(y') H_o^{(2)}(k_o|y-y'|)dy'$$

$$jK_o E_o L[L\cos(q_0 y) + y\sin(q_0 y)] = E_{inc} - \frac{k_o \eta}{4} \int_{-W/2}^{W/2} J_x(y') H_o^{(2)}(k_o|y-y'|)dy'$$

$$\frac{}{L^2 + y^2}$$

Surface Impedance of Near-Field Plate

$$\eta_{sheet}(y) = \frac{E_{total}(y)}{J_x(y)}$$

Implemetation

$$E_x(y, z = L) \approx e^{-q_o L} q_o L \sin c(q_o y)$$

$$E_{total}(y) = E_x(y, z=0) \approx \frac{L[L\cos(q_0 y) + y\sin(q_0 y)]}{L^2 + y^2}$$

APPARATUS FOR SUB-WAVELENGTH NEAR-FIELD FOCUSING OF ELECTROMAGNETIC WAVES

CROSS REFERENCE TO RELATED APPLICATIONS

The present application claims the benefit of U.S. Provisional Application No. 60/938,858, entitled "Apparatus for Sub-Wavelength Near-Field Focusing of Electromagnetic Waves", filed on May 18, 2007, which is hereby incorporated by reference herein in its entirety.

SPONSORED RESEARCH

This invention was made with government support under FA9550-06-1-0279 and FA9550-07-1-0029, awarded by the Air Force Office of Scientific Research. The government has certain rights in the invention.

FIELD OF THE INVENTION

The present disclosure relates generally to techniques for focusing electromagnetic waves and, more particularly, to techniques for sub-wavelength near-field focusing.

BACKGROUND OF RELATED ART

The closely-related problems of electromagnetic imaging and focusing beyond Abbe's diffraction limit (set by $\sim\lambda/n$ where $\lambda$ is the vacuum wavelength and n is the refractive index) have received considerable attention in the past decade, motivated largely by optical studies using sub-wavelength apertures to probe the near field. Techniques such as sharp tip imaging and far-field time reversal mirrors have been proposed to improve the focusing resolution, and factors as large as $\sim 100$ have been achieved in the THz range.

Generally speaking, sub-wavelength focusing techniques involve the evanescent components of the field, i.e., the near field. Because of this, standard interference techniques and geometrical optics methods do not apply. More recent developments have centered on negative refraction techniques to study and to control the electromagnetic near-field. Examples of such work include examinations of perfect lenses as discussed by J. B. Pendry "Negative Refraction makes a Perfect Lens," Phys. Rev. Lett. 85, 3966 (2000) and by R. Merlin, "Analytical Solution of the Almost-Perfect-Lens Problem," Appl. Phys. Lett. 84, 1290 (2004), the experimental verification of negative refraction at microwave frequencies discussed by R. Shelby, D. R. Smith and S. Schultz, "Experimental Verification of a Negative Index of Refraction" Science 292, 77 (2001), and imaging with negative-refractive index slabs discussed by A. Grbic and G. V. Eleftheriades, "Overcoming the diffraction limit with a planar left-handed transmission-line lens," Phys. Rev. Lett. 92, 117403 (2004) and negative permittivity slabs discussed by N. Fang, H. Lee, C. Sun and X. Zhang, "Sub-Diffraction-Limited Optical Imaging With a Silver Superlens" Science 308, 534 (2005).

SUMMARY OF THE INVENTION

The present application describes techniques for creating planar sub-wavelength-patterned structures to provide electromagnetic focusing beyond the diffraction limit. When illuminated by an electromagnetic source, these sub-wavelength-patterned structures force the output wave to converge to a sub-wavelength focus at a focal plane in the near field of the structure. In some examples, these sub-wavelength structures are ring- or grating-like structures that focus electromagnetic radiation to, respectively, spots or lines of arbitrarily small sub-wavelength dimensions in the near-field focal plane.

Generally speaking, a class of aperture field distributions may form a sub-wavelength focus at a prescribed focal plane in the aperture's reactive near field. This approach to sub-wavelength focusing relies on sub-wavelength-patterned planar structures to produce the aperture fields needed to achieve a desired sub-wavelength focus. These planar structures, referred to as near-field plates, can focus electromagnetic radiation to spots or lines of arbitrarily small sub-wavelength size. Moreover, the planar structures may be tailored to produce focal patterns of various shapes and symmetries. At low frequencies, these planar structures act as impedance sheets possessing a modulated, non-periodic surface reactance, where a modulated surface reactance sets up a highly oscillatory electromagnetic field that converges at the plate's focal plane. The near-field plates may be illuminated by plane waves, cylindrical sources, finite sources, or other electromagnetic sources.

There are various techniques to synthesize suitable near-field plates. An example design procedure includes four steps. First, determine a desired sub-wavelength near-field focal focus. Second, the E-field or H-field distribution required at the planar structure to produce this desired focus including determining the current density needed to produce the desired pattern. Third, the impedance (capacitive and inductive reactances) or permittivity profile physically required for the planar structure is determined given a particular illumination source. Fourth, the planar structure is fabricated with the predetermined sub-wavelength features.

The techniques may be implemented across the radiation spectrum and are not limited to a particular frequency range of interest. Some examples are discussed in a microwave realization; however the techniques may be used at radio frequencies (RF), millimeter-wave frequencies, Terahertz, infrared, near infrared, and far infrared, optical, ultraviolet, as well as other frequency ranges desired for particular applications.

In an example, a method for sub-wavelength focusing an incident radiation comprises: determining a desired field pattern at a focal plane, the pattern having a resolution below a wavelength, $\lambda$, of the incident radiation; determining a reference electromagnetic field pattern to produce the desired near-field focus at the focal plane, the reference electromagnetic field pattern being at a reference plane that is at a distance, L, to the focal plane; and forming a planar structure at the reference plane, the planar structure having a sub-wavelength pattern that under illumination by the incident radiation forms the reference electromagnetic field pattern.

In another example, an apparatus for sub-wavelength focusing an incident radiation at a wavelength, $\lambda$, from a radiation source, the apparatus comprising a planar structure having a sub-wavelength pattern that under illumination by the incident radiation forms a reference electromagnetic field pattern that after propagating a near-field distance, L, forms a desired field pattern at a near-field focal plane, where the desired field pattern has a resolution below, $\lambda$, and where L is below $\lambda$.

BRIEF DESCRIPTION OF THE DRAWINGS

FIG. 1A illustrates sub-wavelength focusing in accordance with an example, plotting the magnitude of an electric field (1) at a distance of z/L=1.7 beyond the near-field focal length, L, (2) at the near-field focal plane z/L=1, and (3) at the surface of a planar grating structure (z=0) having cylindrical symmetry;

FIG. 1B illustrates sub-wavelength focusing in accordance with an example, plotting the magnitude of an electric field (1) at a distance of z/L=1.7 beyond the near-field focal length, (2) at the near-field focal plane z/L=1, and (3) at the surface of a planar structure (z=0) having azimuthal symmetry;

FIG. 2B illustrates a contour plot (logarithmic scale) corresponding to the near-field plate of FIG. 2A and of the magnitude of the modulation of the array of FIG. 2A;

FIG. 2C illustrates a contour plot (linear scale) corresponding to the near-field plate of FIG. 2A and the resulting electromagnetic field on the focusing side of the near-field plate;

FIG. 3 is a flow diagram of an example technique for designing a planar structure (near-field plate) capable of producing a sub-wavelength electromagnetic field pattern at a near-field focal plane;

FIG. 4 illustrates an example implementation of the technique of FIG. 3;

DETAILED DESCRIPTION

Figure 2A:
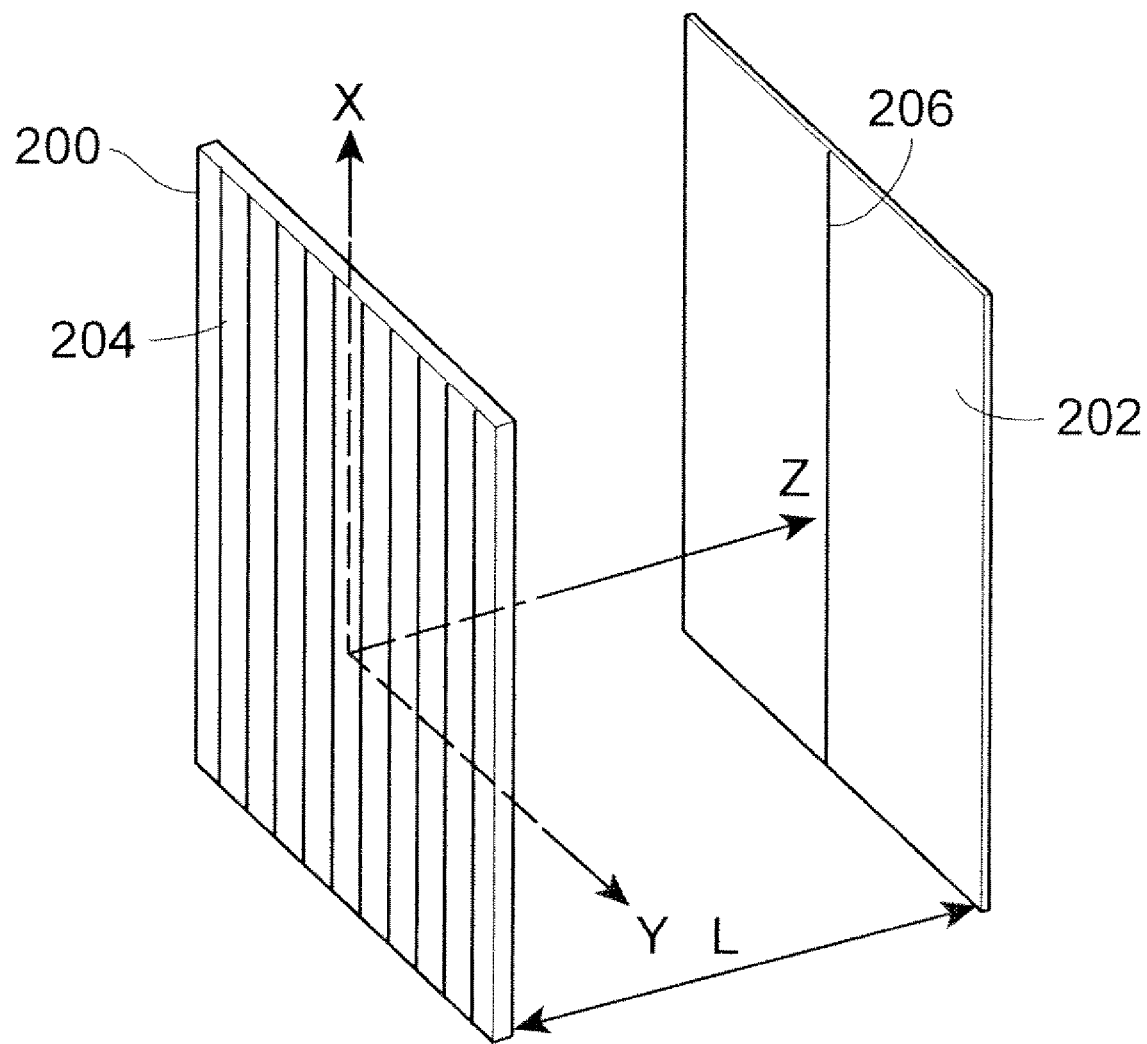
FIG. 2A illustrates a schematic of radiationless interference in accordance with an example, showing a sub-wavelength near-field plate represented as a modulated array of linear current sources at z=0 and the resulting focal line.

To provide background on the techniques herein, take F as one of the Cartesian components of the electric (E) or the magnetic field (H) of an electromagnetic wave. Assume that all field sources are monochromatic, with time-dependence given by $e^{-i\omega t}$ (where $\omega$ is the angular frequency). Further assume that each field is orientated to originate from one side of a particular plane, defined as z=0. Then, for $z \geq 0$, F satisfies the Helmholtz wave equation $\nabla^2 F + k^2 F = 0$ and can thus be expressed in the form:

$$F(x, y, z_\alpha) = \frac{1}{4\pi^2} \int\int\int\int_{-\infty}^{+\infty} F(x', y', z_\beta) e^{i\begin{bmatrix} q_x(x-x')+ \\ q_y(y-y')+ \\ \kappa(z_\alpha - z_\beta) \end{bmatrix}} dx' dy' dq_x dq_y \quad (1)$$

which provides an exact relationship between the solution to the wave equation in two arbitrary planes parallel to each other and above z=0, i.e., $z=z_\alpha>0$ and $z=z_\beta>0$. With $k=2\pi/\lambda$, $\kappa$ in the F field expression Eq. (1) will have one of the following two values depending on the relative values shown:

$$\kappa = \begin{cases} i|(q_x^2 + q_y^2 - k^2)^{1/2}| & q_x^2 + q_y^2 \geq k^2 \\ |(k^2 - q_x^2 - q_y^2)^{1/2}| & q_x^2 + q_y^2 < k^2 \end{cases} \quad (2)$$

With the F field source originating in the half-space z<0, the choice between the two K expressions in Eq. (2) is dictated by the requirements that the homogeneous and inhomogeneous (or evanescent) solutions to the wave equation must travel and decay in the positive z direction, respectively.

According to Eq. (1), the field in the region $z \geq 0$ is determined by the boundary values F(x,y,0). Thus, to obtain a desired focusing effect at the focal plane (for, both, the sub-wavelength and the conventional, diffraction-limited cases) one needs to identify the source or sources needed to generate the field profile at z=0 that will converge to a desired spot at the focal plane, z=L. While the angular-spectrum representation of Eq. (1) shows that F(x,y,0) is uniquely determined from the focal plane values, F(x,y,L), due to general inexactness in how one defines the "focal spot" size or pattern, the wrong choice of F(x,y,L) may result in a field that is unsuitable for certain applications or that diverges or does not exist (everywhere in a region or at certain points). The wrong identification of the desired field pattern at the near-field focal plane, F(x,y,L), may result in a boundary field that is difficult to implement in practice.

To address this uncertainty, F(x,y,0) is defined by the transmission properties of sub-wavelength-patterned planar structures that behave, in some sense, like the evanescent-wave counterparts to Fresnel's zone plates. Similar to these plates, electromagnetic waves exit the planar structures in a pattern set by the structure's design, which has a pattern that forces the incident electromagnetic waves to converge onto a spot on the focal plane, as prescribed by Eq. (1). Unlike Fresnel plates, however, which rely on interference involving radiative components of the field (and are thus subjected to Abbe's constraint), the planar structures (e.g., near-field plates) of the present application primarily affect the evanescent (non-radiative) waves leading to interference effects that are electrostatic or magnetostatic in nature. As a result, the applicants have found that the feature size at a near-field focal plane can be made arbitrarily small, significantly smaller than with conventional techniques.

These planar structures may be tailored to give sub-wavelength focal patterns of various types and symmetries. Two example geometries of planar structures are cylindrical- and azimuthal-symmetrical geometries. The first may be used to produce a sub-wavelength line focus at the near-field focal plane. The second may be used to produce a sub-wavelength spot size at the near-field focal plane. While these example implementations are discussed in more detail, any type of focus may be formed in the near field. In fact, the techniques are typically driven by first determining a desired focus in the near field and then deriving the pattern for the sub-wavelength planar structure that will produce that near-field focus.

For the cylindrical symmetry geometry or two-dimensional case, $\partial F/\partial x=0$, the perfect focus is an infinitesimally thin line (see, e.g., FIG. 1A), and Eq. (1) becomes:

$$F(y, z_\alpha) = \frac{1}{2\pi} \int\int_{-\infty}^{+\infty} F(y', z_\beta) e^{i[q(y-y')+\kappa(z_\alpha-z_\beta)]} dy' dq \quad (3)$$

where $\kappa(q)$ is given by (2) with $q_x^2+q_y^2 \to q^2$.

For electromagnetic fields propagating in the $+z$ direction having azimuthal symmetry (e.g., axicons and Bessel beams and FIG. 1B), the tangential $\phi$-component of the electric field (E) and the z- and the radial $\rho$-components of magnetic field (H) vanish, leaving the non-zero components of $\Psi=H_\phi$ or $E_\rho$ to follow the expression:

$$\Psi(\rho, z_\alpha) = \int\int_{-\infty}^{+\infty} \Psi(\rho', z_\beta) J_1(q\rho') J_1(q\rho) e^{i\kappa(z_\alpha-z_\beta)} \rho' d\rho' q dq. \quad (4)$$

Replacing the Bessel function $J_1$ by $J_0$, one obtains the corresponding expression for $E_z$. Note that the electric field expression for the cylindrical geometry, i.e., $e^{iq_0y} \exp[i\kappa(q_0)z]$, and the electric field expression for the azimuthal geometry, i.e., $J_1(q_0\rho) \exp[i\kappa(q_0)z]$, are solutions of Eqs. (3) and (4), respectively, for arbitrary $q_0$, and become evanescent modes for $|q_0|>k$ (i.e., $k=2\pi/\lambda$). For $|q_0|<k$, the corresponding fields are the well known diffraction free plane waves and Bessel beams. As discussed below, these states and, more generally, fields with components of the form $f_{q_0}(\rho) \exp[i\kappa(q_0)z]$, where $\rho$ is a vector normal to the z-axis, play an important role in near-field focusing.

The sub-wavelength focusing approaches rely on a previously-unconsidered property of the Helmholtz equation to create sub-wavelength focusing. Assume that a certain field component (Cartesian or otherwise) at $z=0$ is of the form $M(\rho) \times f_{q_0}(\rho)$, where $f_{q_0} \exp[i\kappa(q_0)z]$ is part of a full solution to Maxwell's equations and M is a modulation function characterized by the length scale L, and which satisfies the requirements specified below. Then, it can be shown for $|q_0| \gg k$ that the field converges to a focal spot with a resolution defined by $l=2\pi/|q_0|$, after propagating from a planar structure exhibiting the modulation behavior defined by M through a distance of order L, in the z direction.

This effect is illustrated in FIGS. 1A and 1B for, both, the cylindrically- and azimuthally-symmetric cases, respectively. For the cylindrical geometry case, in Eq. (3), take $z_\alpha=z_\beta=0$ and $F(y,0)=M(y)e^{iq_0y}$. Because for $|q_0| \gg k$ the relevant states are evanescent waves, the approximation $\kappa K(q) \approx i|q|$ may be used, so that the electric field expression becomes $F(y,z) \approx \iint e^{iqy} e^{-|q|z} M(y') e^{i(q_0-q)y'} dy' dq/2\pi$.

Lensing will occur for a wide choice of modulation functions on the planar structures at the $z=0$ plane. Mathematically speaking, a sufficient condition for focusing is that the modulation M should have one or more poles in the complex plane with non-zero imaginary components. To prove that this is the case, we assume that $M(y)$ (the modulation along the y axis) is a real and even function, with poles at $\pm iL$. Performing a simple integration, we obtain $$F(y, z) \propto \left[ \frac{e^{q_0(iy+L-z)}-1}{iy+L-z} + \frac{(iy+L+z)e^{q_0(iy+L-z)}+(-iy+L+z)}{y^2+(z+L)^2} \right] \quad (5)$$

The first term of this expression leads to focusing at $z=L$ such that, for $L \gg l$, $|F(y,L)|^2 \propto |\sin(q_0y/2)/y|^2$. The second term gives an essentially featureless (slowly varying) background. Because there is no phase associated with the evanescent waves extending above the planar structures, conventional thinking would be that the lensing process would not show signs of conventional interference. But indeed that is the case, as shown particularly in the way waves constructively and destructively add at the focal plane, $z=L$. Because the focusing process involves nonradiative modes, we refer to this unconventional form of focusing as "radiationless interference."

FIG. 1A shows plots of $|F(y,z)|^2$, obtained from Eq. (3), for $f_{q_0}=e^{iq_0y}$ and $M=(1+y^2/L^2)^{-1}$, at three different z positions: $z/L=1.7$ (beyond the near-field focal plane); $z/L=1$ (at the near-field focal plane); and $z/L=0$ (at the planar structure). This form of M is the simplest one for an even function with poles along the y axis at $y=\pm iL$. The calculations are consistent with Eq. (5) and demonstrate that the focal length and the resolution are determined, respectively, by the modulation length, L, and the length scale of the unperturbed field component, l. FIG. 1B shows that the modulated azimuthally symmetric field (ring-like focus) exhibits a similar effect, and at different z positions: $z/L=1.7$ (beyond the near-field focal plane); $z/L=1$ (at the near-field focal plane); and $z/L=0$ (at the planar structure). The periodicity of the features of the sub-wavelength planar structures determines the resolution (i.e., spot size) of the sub-wavelength focusing at the near field, and the modulation length, L, determines the focal length. The criterion for defining the resolution at the focal plane is the standard ½ power beam width definition for spot size.

Although these examples stem from simple poles located in the imaginary axis, it can be easily shown (i) that focusing can also be attained with higher-order poles, (ii) that modulation functions with multiple poles give multiple foci, and (iii) that the real and imaginary part of a given pole determine, respectively, the off-axis position of the focal spot and the corresponding focal length for the system.

The analyses herein may also be applied to a negative-refraction slab that exhibits perfect focusing at $n=-1$. For $|1+n| \ll 1$ and a source consisting of a line of dipoles. The expressions for the field are known analytically, as discussed in the works of R. Merlin, "Analytical Solution of the Almost-Perfect-Lens Problem" Appl. Phys. Lett. 84, 1290 (2004)," and G. W. Milton, N. A. P. Nicorovici, R. C. McPhedran and V. A. Podolskiy, "A proof of superlensing in the quasistatic regime, and limitations of superlenses in this regime due to anomalous localized resonance" Proc. Royal Soc. A 461, 3999 (2005). In particular, if the slab thickness is d and the source is at a distance d/2 from the slab surface (and, therefore, its image is at d/2 from the other surface), the modulated evanescent field at the exit side of the slab can be written as $M(y)e^{iq_0y}$ where $$M(y) \propto \frac{\cosh(\pi y/2d) - i\sinh(\pi y/2d)}{\cosh(\pi y/2d) + i\sinh(\pi y/2d)} \qquad (6)$$

and $q_0 = -\ln|1+n|/d$. As expected, $M(y)$ exhibits a pole at $y=id/2$ reflecting the image location and, moreover, the expression for $q_0$ is in perfect agreement with the known slab resolution. Since $M(y)$ has an infinite number of additional poles at $y=i(d/2+2\,pd)$, where $p>0$ is an integer, a near-perfect slab will exhibit not just one, but an infinite number of images, for which the intensity decays exponentially with p.

For a two-dimensional geometry, the above results can be extended from the simple sinusoidal to the general case of a periodic field $P_f(y)$, of period l. It is apparent that, for boundary values given by $F(y, 0)=M(y)P_f(y)$, the field will converge at $z=L$ to a focal spot of size ~l. Thus for cylindrical source near-field lensing, because a periodic field can be simply realized by letting a plane wave go through an array of periodically-placed slits (or ribbons), it is clear that a field of the form $M(y)P_f(y)$ may be attained by introducing a slowly-varying modulation in, say, the width of or the properties of the material forming the planar sub-wavelength focusing structure. Similarly, in the case of azimuthal symmetry, a Bessel beam can be used together with a set of concentric rings of properly-modulated width or material placed at radii satisfying $J_f(q_0\rho)=0$.

The near-field focusing plates or other near-field planar structures may be formed through fabrication techniques, such as lithography and etching or milling that form conductive or dielectric patterns on underlying substrates. The resolution of the patterns on the planar structure must be smaller than that of the incident wavelength. Therefore, for many operating wavelengths, electron beam or ion beam lithography may be used to form photolithography masks with sub-wavelength features from which the planar structures are photolithographically fabricated. For optical wavelengths, planar structures may be formed using nano-fabrication techniques capable of forming 300-400 Angstrom structures, for example. For Terahertz frequencies, features on the order of 300 microns would be appropriate. These are provided by way of example, as the techniques are not limited to particular methods of fabrication. Furthermore, the features on the planar structures may be conductive or dielectric in nature. Further still, planar structures used in the optical domain may be formed of plasmonic strips (permittivity<0) or dielectric strips (permittivity>0) printed on substrates, where dielectric strips may be used to form capacitive reactance features while plasmonic strips (e.g., Ag or Au) may be used to form inductive elements. In some examples, the planar structures may be formed by modulating the thickness of the substrate itself, whether dielectric, plasmonic or other material. Such techniques may be used for infrared (mid, near, far) and ultraviolet regions as well, as they will be able to form features that are smaller than the wavelength of the illumination source for the system.

In typical applications, it is desirable to design the planar structures to minimize or remove the featureless (slowly-varying) background signal, such as that resulting from the second term of Eq. (5), because such a background signal could overwhelm the sharp features of the near-field focus. FIGS. 2A-2C illustrates an example of background-free focusing. FIG. 2A shows the configuration of the Cartesian coordinate system and showing the modulation across the y-axis with the z-axis defining a focusing direction along which the near-field focusing occurs. A planar structure 200 is positioned at $z=0$, while the near-field focal plane 202 is positioned at a point $z=L$. The planar structure is a near-field plate patterned with a linear grating-like structure 204 that can focus electromagnetic radiation from a source (not shown) to sub-wavelength dimensions. The pattern 204 shown in FIG. 2A is that of a finely structured pattern that acts as a modulated (non-periodic) surface reactance. The modulated reactance sets up a highly oscillatory field at the planar structure's surface, which produces the distribution patterns shown in FIGS. 2B and 2C at $z=0$, and which focus that radiation to a spot in the near-field focal plane, $z=L$. An example sub-wavelength line focus pattern 206 is shown by way of example and corresponding to the position $z/L=1$ in FIGS. 2B and 2C.

The results shown in FIGS. 2A-2C are for the diffraction of a plane wave by a set of linear parallel ribbons (i.e., g linear current arrays) of very narrow width <<l and having an induced current density expressed by:

$$j_x \propto \delta(z) \sum_{s=-\infty}^{\infty} \frac{(-1)^s \delta(y-sl)}{(1+s^2l^2/L^2)} \qquad (7)$$

where the incident electric field is parallel to the cylindrical (z) axis. Such an array of currents, with the sign varying from one element to the next, can be realized at infrared and optical frequencies, for example, by using material with positive and/or negative permittivity and, and in the microwave regime, by using the right sequence of capacitors and inductances. A comparison between the contour plot for the y-component of the diffracted magnetic field is shown in FIG. 2B in a logarithmic scale. The results reported for negative-refraction slabs reveals the close relationship between both phenomena.

Finally, to help demonstrate the sub-wavelength focusing resulting in the near-field focusing, FIG. 2C shows a linear scale plot of the field intensity, normalized to its largest value at a given z. The figure shows behavior suggesting beam coupling, in that the interaction of the central beam with its neighbors appears to prevent the diffraction of the central beam out of the planar structure. It is only after the intensity of its neighbors has decreased a sufficient amount that the central beam is allowed to diffract, and this crossover point in the z-axis, where diffraction begins to occur, identifies the near-field focal length of the system.

Above, ring-like (FIG. 1B) and grating-like (FIGS. 1A and 2A-2C) structures are near-field plates capable of focusing electromagnetic radiation (evanescent waves) to spots or lines, of arbitrarily small sub-wavelength size. FIG. 3 illustrates a general technique 300 for designing a near-field plate to achieve a specific sub-wavelength focus.

A block 302 provides the desired near-field focal plane pattern, for example as an expression of a one- or two-dimensional E-field expression, where typically this pattern will be a sub-wavelength pattern, i.e., with a resolution and feature size below the operating wavelength, $\lambda$, of the incident light. A block 304 determines the field pattern at the surface of the planar structure, $E_{total}$, that is needed to produce the desired focus, by mathematically back-propagating the desired sub-wavelength focus from the near-field focal plane to the surface of the planar structure. The block 304 also determines the surface current density $J_x$ needed to produce $E_{total}$, in the presence of an excitation field. A block 306 calculates the surface impedance of the planar structure using the expression $E_{total}/J_x$. A block 310 implements this surface impedance, for example, by discretizing the surface of the planar structure into sub-wavelength impedance elements that approximate the derived surface impedance. An example application of certain blocks is shown in FIG. 4 and discussed below.

To design a near-field plate, one may first select what focus is desired at the near-field focal plane at block 302. From that focus, the system derives the fields that must be present at the surface of the planar structure (i.e., near-field focusing plate) to create that focus. For example, a Fourier transform may be taken of the desired focus $f(x, y, z=L)$ to obtain its plane-wave spectrum $F(k_x, k_y, z=L)$:

$$F(k_x, k_y, z = L) = \int_{-\infty}^{\infty}\int_{-\infty}^{\infty} f(x', y', L)e^{+j(k_x x' + k_y y')} dx' dy' \quad (8)$$

where the harmonic time dependence is $e^{j\omega t}$. The plane-wave spectrum of the focus is then back-propagated to the plane of the near-field plate (planar structure), located at $z=0$:

$$F(k_x, k_y, z=0) = F(k_x, k_y, L)e^{+j(k_x x + k_y y + k_z L)} \quad (9)$$

where $k_z = \sqrt{k_0^2 - k_x^2 - k_y^2}$ when $k_x^2 + k_y^2 k_0^2$ $k_z = -j\sqrt{k_x^2 + k_y^2 - k_0^2}$ when $k_x^2 + k_y^2 > k_0^2$ where $k_0$ is the wavenumber in free space.

This back-propagation refers to the process of reversing the phase of the propagating plane-wave spectrum and growing (restoring) the evanescent plane-wave spectrum, in order to recover the complete plane-wave spectrum at the near-field plate ($z=0$). In a second step, summing the plane-wave spectrum at $z=0$, the block 304 recovers the field at the near-field focusing plate, producing an expression similar to that of Eq. (1) above:

$$f(x, y, z = 0) = \frac{1}{4\pi^2}\int_{-\infty}^{\infty}\int_{-\infty}^{\infty} F(k_x, k_y, L)e^{+j(k_x x + k_y y + k_z z)} dk_x dk_y \quad (10)$$

In this second step, the block 304 also determines the current density needed to produce the field at the planar surface in the presence of the source excitation. For example, the current density may be found by solving an integral equation representing the boundary condition at the surface of the near-field plate. For a third step, the block 306 calculates the surface impedance that yields $f(x; y; z=0)$. This surface impedance may be computed by taking the ratio of the field at the near-field plate's surface to the derived current density. Finally, during a fourth step, an implementation (fabrication) step, the block 308 realizes the surface impedance using materials appropriate to the frequency of operation.

Figure 5:
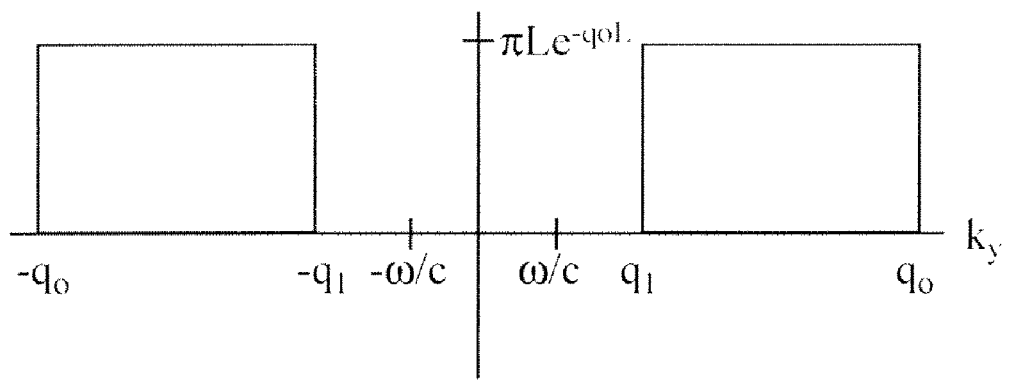
FIG. 5 is a plot of the plane spectrum of the focus given by Eq. (11) below.

Near-field plates can be designed that produce focal patterns of various types and symmetries. Here, we consider a near-field plate that focuses evanescent waves in two dimensions: y and z. In the subsequent discussion we will assume that there is no variation in the x direction. The y coordinate will denote the direction transverse to the near-field focusing plate and z will denote the direction normal to the surface of the plate (see FIG. 2A). For this particular design, the focus along the focal plane ($z=L$) is chosen to be a sinc function of the following form:

$$f(x,y,z=L) = e^{-q_o L} q_o L \mathrm{sinc}(q_o y) - e^{-q_o L} q_1 L \mathrm{sinc}(q_1 y) \quad (b\ 11)$$

where $\mathrm{sinc}(\theta) = \sin(\theta)/\theta$ and $|q_o| \gg |q_1| \gg |k_o|$, $k_o$ is the wavenumber in free space. The focal pattern given by Eq. (11) has a flat evanescent-wave spectrum of magnitude $\pi L e^{-q_o L}$ that extends between $q_1 < |k_y| < q_o$, as depicted in FIG. 5. Such a focus could be expected when imaging a line source with a negative permittivity slab (a silver superlens), for example. The propagating spectrum is zero at the focal plane since it is totally reflected by the negative permittivity slab, but the evanescent spectrum is still present. The spatial frequency $k_y = q_o$ represents a cut-off wavenumber above which transmission through the slab rapidly falls off. However, instead of having the evanescent spectrum fall off as in focusing using a negative permittivity slab, we have simply assumed that it is truncated beyond $k_y = q_o$. This cut-off wavenumber $k_y = q_o$ corresponds to the losses of the negative permittivity slab. Under the condition that $q_o \gg q_1$, the focus simplifies to:

$$f(x,y,z=L) \approx e^{-q_o L} q_o L \mathrm{sinc}(q_o y) \quad (12)$$

To find what field distribution $f(x, y, z=0)$ is needed at the near-field plate to produce such an focus, we back-propagate the plane-wave spectrum of the focal pattern and then sum it up at $z=0$:

$$f(x, y, 0) = \frac{1}{2\pi}\int_{-q_o}^{-q_1} \pi L e^{-q_o L} e^{+jk_z L} e^{+jk_y y} dk_y + \\ \frac{1}{2\pi}\int_{q_1}^{q_o} \pi L e^{-q_o L} e^{+jk_z L} e^{+jk_y y} dk_y \quad (13)$$

Since we are in the sub-wavelength region ($|q_o| \gg q_1 \gg |k_o|$) $k_z \approx -j|k_y|$. Therefore, Eq. (13) can be expressed as:

$$f(x, y, 0) \approx \quad (14)$$
$$\frac{1}{2\pi}\int_{-q_o}^{-q_1} \pi L e^{-q_o L} e^{|k_y| L} e^{+jk_y y} dk_y + \frac{1}{2\pi}\int_{q_1}^{q_o} \pi L e^{-q_o L} e^{|k_y| L} e^{+jk_y y} dk_y$$

Performing the above integration, the following expression is obtained for the field at the surface of the near-field plate:

$$f(x, y, 0) \approx \frac{L[L\cos(q_o y) + y\sin(q_o y)] - Le^{(q_1 - q_o)L}[L\cos(q_1 y) + y\sin(q_1 y)]}{[L^2 + y^2]} \quad (15)$$

Given that $q_o \gg q_1$, the expression for the E-field at the planar structure's position to achieve the desired focal pattern simplifies to:

$$f(x, y, 0) \approx \frac{L[L\cos(q_o y) + y\sin(q_o y)]}{[L^2 + y^2]} \quad (16)$$

From Equations (12) and (16), it is apparent that the field at the near-field plate decays toward the focal plane. Specifically, the amplitude of the field along $y=0$ decays from the near-field plate ($z=0$) to the focal plane ($z=L$) by an amount equal to:

$$e^{-q_o L} q_o L \quad (17)$$

Figure 6A:
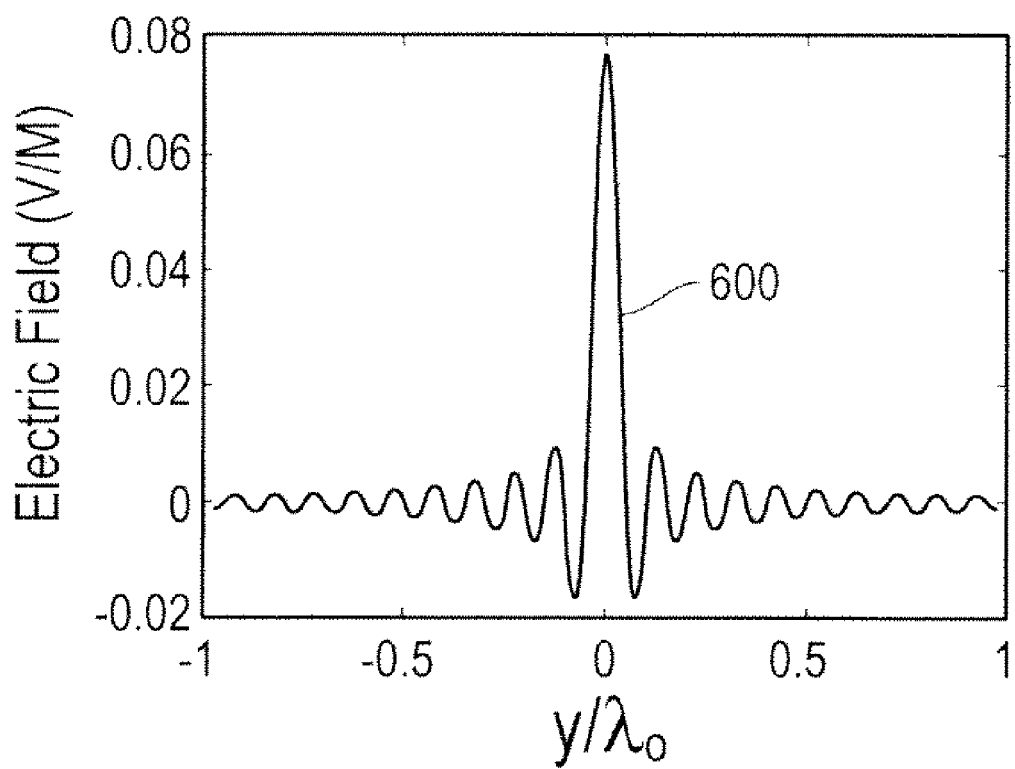
FIGS. 6A and 6B illustrate the desired electromagnetic field pattern at a near-field focal plane and the reference electromagnetic field pattern at a reference plane, respectively.
Figure 6B:
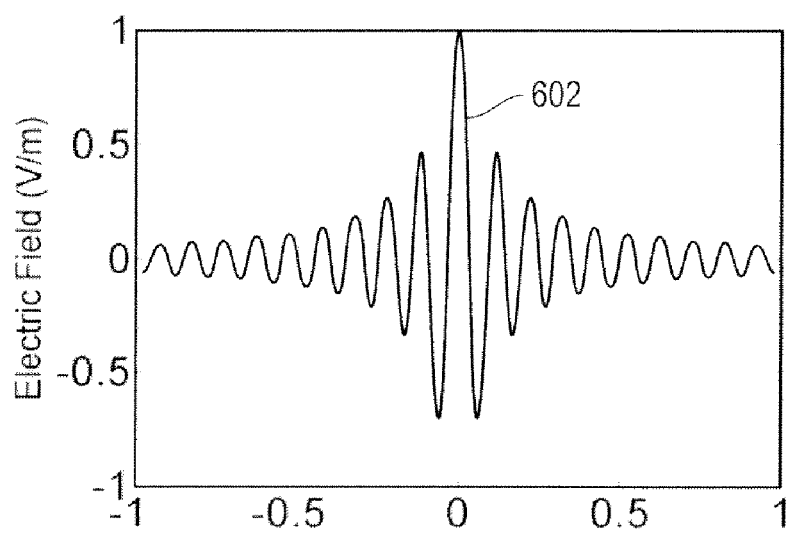

The fields $f(x, y, 0)$ and $f(x, y, z=L)$, given by Equations (12) and (16) respectively, are plotted in FIGS. 6A and 6B for the case where $q_o = 10 k_o$ and $L = \lambda/16$. FIG. 6A shows a desired near-field focal pattern 600. FIG. 6B shows the E-field pattern 602 needed at $z=0$ to achieve that near-field focus. From Eq.

(12), it can also be found that the null-to-null beamwidth of the focus at the focal plane (z=L) is:

$$\Delta y = 2\pi/q_o \tag{18}$$

Expressing $q_o$ as a multiple of the free-space wavenumber $q_o=R_e k_o$, the null-to-null beamwidth of the focus can be rewritten as:

$$\Delta y = \frac{2\pi}{R_e k_o} = \frac{\lambda_o}{R_e} \tag{19}$$

where $\lambda_o$ is the wavelength in free space, and $R_e$ is what has often been referred to as the resolution enhancement. Further, expressing the distance to the focal plane L as a fraction of a free-space wavelength $L=\lambda_o/M$, the decay of the field (Eq. (17)) along the z axis from the near-field plate to the focal plane can be rewritten as:

$$e^{-2\pi R_e/M} \frac{2\pi R_e}{M} \tag{20}$$

From Eq. (20) it can be concluded that the ratio of $R_e/M$ cannot be excessively high for the signal to still be detectable at the focal plane of the near-field plate.

Eq. (16) indicates that the field at the near-field plate has both phase and amplitude variation. A simple way to generate such a field distribution is to illuminate a reactance sheet located at z=0 from the −z direction with a plane wave. The sheet should have a surface reactance that is a function of position y corresponding to the phase and amplitude variation of the field at its surface.

Capacitive and inductive surface impedances can be used to produce fields that are 180° out of phase. One can also change the magnitude of the transmitted field by varying the magnitude of the inductive or capacitive sheet reactance. Therefore, by using a near-field plate with a reactance that is modulated as a function of y, one can synthesize various field profiles including the one given in Eq. (16). In fact, the transmitted field at the focal plane of a modulated reactance sheet (i.e., a near-field plate) can be manipulated accurately while maintaining a relatively high field amplitude. FIGS. 10-13 below illustrate example near-field plates formed of capacitive elements providing a desired reactance to achieve a desired near-field focus.

To design a near-field plate that focuses energy from a plane wave (i.e., two dimensional light source) to sub-wavelength line focus at the z=L plane, the plane wave may be assumed to be polarized along the x direction and incident from the −z direction onto the near-field plate located at z=0. The y—dependent surface impedance of the near-field plate will be represented as $\eta_{sheet}(y)$. Similarly, the x—directed current density induced on the near-field plate will be represented as $J_x(y)$. The boundary condition along the reactance sheet (near-field plate) can then be represented as a Fredholm integral equation of the second kind:

$$E_o - \frac{k_o \eta_0}{4}\int_{-W/2}^{W/2} J_x(y')H_0^{(2)}(k_o|y-y'|)dy' = \eta_{sheet}J_x(y) \tag{21}$$

where $E_o$ is the amplitude of the incident plane wave at z=0, $H_o^{(2)}$ is a Hankel function of the second kind of order zero, and W is the width of the near-field plate. In the integral equation, the unknown current density appears both inside and outside of the integral sign. The total field at the surface of the near-field plate therefore is:

$$E_{total}(y) = E_o - \frac{k_o \eta}{4}\int_{-W/2}^{W/2} J_x(y')H_o^{(2)}(k_o|y-y'|)dy' \tag{22}$$

Equating $E_{total}(y)$ to the field desired at the surface of the near-field plate, given by Eq. (16), one can solve for $J_x(y)$. Eq. (16) has been multiplied by the scaling factor $jK_o E_o$ to obtain the following equation for $J_x(y)$:

$$\frac{jK_o E_o L[L\cos(q_o y) + y\sin(q_o y)]}{[L^2 + y^2]} = \tag{23}$$

$$E_o - \frac{k_o \eta}{4}\int_{-W/2}^{W/2} J_x(y')H_o^{(2)}(k_o|y-y'|)dy'$$

The desired field has been multiplied by the imaginary number j in order to obtain predominantly passive (inductive and capacitive) surface impedances for the near-field plate design. The variable $K_o$ represents the amplitude of $E_{total}$ as a multiple of the incident field $E_o$. A larger $K_o$ represents a higher field amplitude at the surface of the near-field plate, and therefore a more highly resonant plate. The origin of the resonance, that can lead to high amplitudes of $E_{total}$ becomes evident if Eq. (21) is rearranged as follows:

$$E_o = J_x(y)\eta_{sheet} + \frac{k_o \eta_0}{4}\int_{-W/2}^{W/2} J_x(y')H_0^{(2)}(k_o|y-y'|)dy' \tag{24}$$

The second term on the right-hand side of the Eq. (24) represents the field at a location y on the plate, due to the neighboring current elements. Therefore, the Hankel function represents a mutual impedance. This mutual impedance is predominantly inductive since $H_0^{(2)}$ has a positive imaginary part for small arguments ($k_o|y-y'|<0.89357$), that is, closely spaced current elements. Under the special condition where $\eta_{sheet}$ is capacitive, a cancellation of reactance occurs between the first and second terms of the right-hand side of Eq. (24). This leads to a high current density at the plate, since the equality of Eq. (24) must be maintained. The high current density results in an amplified $E_{total}$ amplitude, and therefore an amplified field at the focal plane.

To obtain the unknown current density $J_x(y)$, Eq. (22) can be solved numerically. Finally, dividing $E_{total}(y)$ by the computed current distribution $J_x(y)$, the surface impedance $\eta_{sheet}(y)$ can be found. Once the surface impedance is found the design of the near-field plate is complete.

The procedure for deriving $\eta_{sheet}(y)$ does not ensure that $\eta_{sheet}(y)$ is passive. To enforce that the near-field plate is entirely passive, only the imaginary part of the derived $\eta_{sheet}(y)$ is taken. The current density $J_x(y)$ is then solved for again by plugging the passive $\eta_{sheet}(y)$ into Eq. (21). Once the current density is found for the passive near-field plate, the fields scattered by the near-field plate are computed using the two dimensional free-space Green's function:

$$E_x^s(y, z) = -\frac{k_o \eta}{4} \int_{-W/2}^{W/2} J_x(y') H_o^{(2)}\left(k_o \left|\sqrt{(y-y')^2 + z^2}\right|\right) dy' \quad (25)$$

The total field at any point is then the sum of the incident plane-wave $E_o e^{-jk_o z}$ and the scattered field $E_x^s(y, z)$ due to the induced current density $J_x(y)$ on the near-field plates.

A specific near-field plate design at a microwave frequency of 1.0 GHz ($\lambda_o=300$ mm) is now considered. For this particular design $q_o=10$ $k_o=10\omega/c$, or equivalently $\Delta y=\lambda_o/10=30$ mm. In addition, the focal plane is chosen to be $L=\lambda_o/16=18.7$ mm from the near-field plate. Hence, the near-field plate is capable of creating a focal spot with a null-to-null beamwidth of $\lambda_o/10$ at a distance $\lambda_o/16$ from the plate. In addition, the width of the near-field plate (W) is chosen to be approximately 2 wavelengths in the y direction and the constant $K_o$ is set to $K_o=6$. In other words, the field at (y,z)=(0,0) is five times the amplitude of the incident plane wave ($E_o$).

The current density $J_x(y)$ on the near-field plate is discretized into 79 segments in order to solve Eq. (23) numerically. The segments are centered at positions $(y,z)=(n\delta,0)$, where n is an integer from −39 to 39, and δ is the width of each segment. The variable δ is chosen to be $\ll \Delta y$ to mimic a continuous variation in surface impedance: $\delta=\lambda_o/40=7.5$ mm. Collocation (the point matching method) was used to solve for the current density on the near-field plate, from which the surface impedance of the near-field plate was subsequently found. In the computations it was assumed that the incident plane wave is equal to $E_o=1$V/m at the surface of the near-field plate. Table I below shows the surface impedances of the δ segments of the near-field plate. The plate is symmetric so the surface impedances of only 40 segments (n=0 to n=39) are shown. Column two of Table 1 shows the impedances that are derived directly from Eq. (23); column 3 lists the passive surface impedances used in the design of the passive near-field plate. They are completely imaginary and represent inductive and capacitive surface impedances.

TABLE I

Surface Impedances of the Near-Field Focusing Plate

| n | Z sheet | Passive Z sheet |
|---|---|---|
| 0 | −0.0540 −24.8811i | −24.8811i |
| 1 | −0.3078 −34.9762i | −34.9762i |
| 2 | 0.0497 −18.8400i | −18.8400i |
| 3 | 0.0830 −22.1429i | −22.1429i |
| 4 | −0.0866 −17.4066i | −17.4066i |
| 5 | −0.0874 −21.3768i | −21.3768i |
| 6 | 0.0968 −14.1181i | −14.1181i |
| 7 | 0.0705 −18.3300i | −18.3300i |
| 8 | −0.2215 −18.0665i | −18.0665i |
| 9 | −0.0862 −20.3643i | −20.3643i |
| 10 | 0.1165 −12.1702i | −12.1702i |
| 11 | 0.0536 −17.3865i | −17.3865i |
| 12 | −0.3545 −22.2030i | −22.2030i |
| 13 | −0.0480 −20.5220i | −20.5220i |
| 14 | 0.0419 −10.3653i | −10.3653i |
| 15 | 0.0049 −16.8255i | −16.8255i |
| 16 | 0.3176 −33.9907i | −33.9907i |
| 17 | 0.0482 −20.9474i | −20.9474i |
| 18 | −0.0994 −8.6930i | −8.6930i |
| 19 | −0.0696 −16.3809i | −16.3809i |
| 20 | 27.6488 −97.2412i | −97.2412i |
| 21 | 0.1922 −21.4451i | −21.4451i |
| 22 | −0.2328 −7.2934i | −7.2934i |
| 23 | −0.1455 −16.0315i | −16.0315i |

TABLE I-continued

Surface Impedances of the Near-Field Focusing Plate

| n | Z sheet | Passive Z sheet |
|---|---|---|
| 24 | 29.1460 +63.0469i | +63.0469i |
| 25 | 0.3231 −21.8837i | −21.8837i |
| 26 | −0.2867 −6.2742i | −6.2742i |
| 27 | −0.1752 −15.7837i | −15.7837i |
| 28 | 5.6876 +26.9105i | +26.9105i |
| 29 | 0.2934 −22.2145i | −22.2145i |
| 30 | −0.1685 −5.5034i | −5.5034i |
| 31 | −0.0641 −15.6296i | −15.6296i |
| 32 | −0.1209 +17.9582i | +17.9582i |
| 33 | −0.2211 −22.4108i | −22.4108i |
| 34 | 0.3371 −4.9484i | −4.9484i |
| 35 | 0.4372 −15.5174i | −15.5174i |
| 36 | −5.3426 +9.7995i | +9.7995i |
| 37 | −2.4484 −22.4780i | −22.4780i |
| 38 | 1.7231 −3.3621i | −3.3621i |
| 39 | 4.4763 −13.2700i | −13.2700i |

Figure 7:
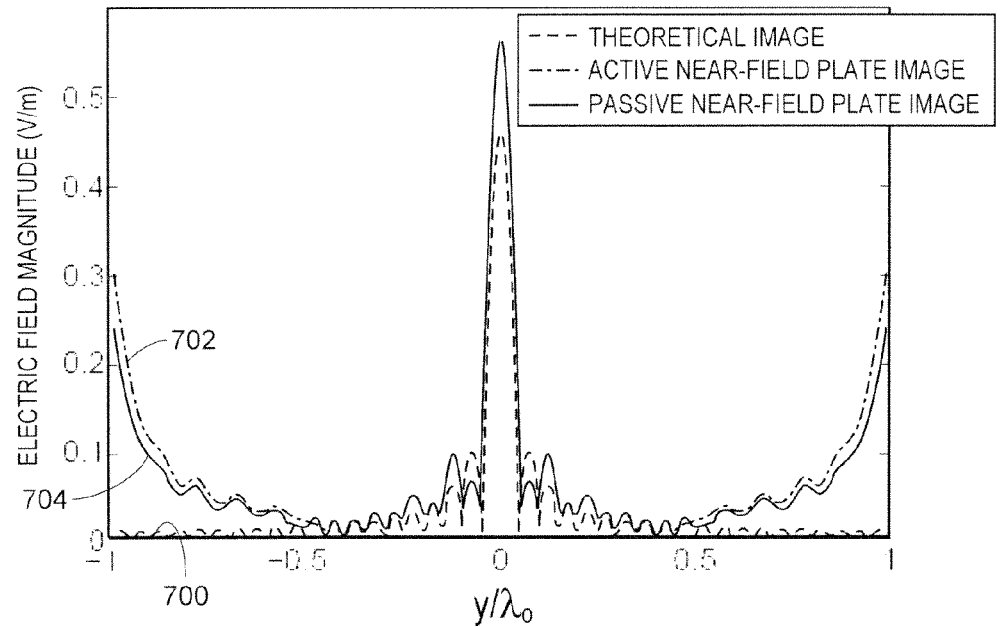
FIGS. 7-9 illustrate different electric field profiles at the focal plane of the near-field focusing plate in accordance with different examples.
Figure 8:
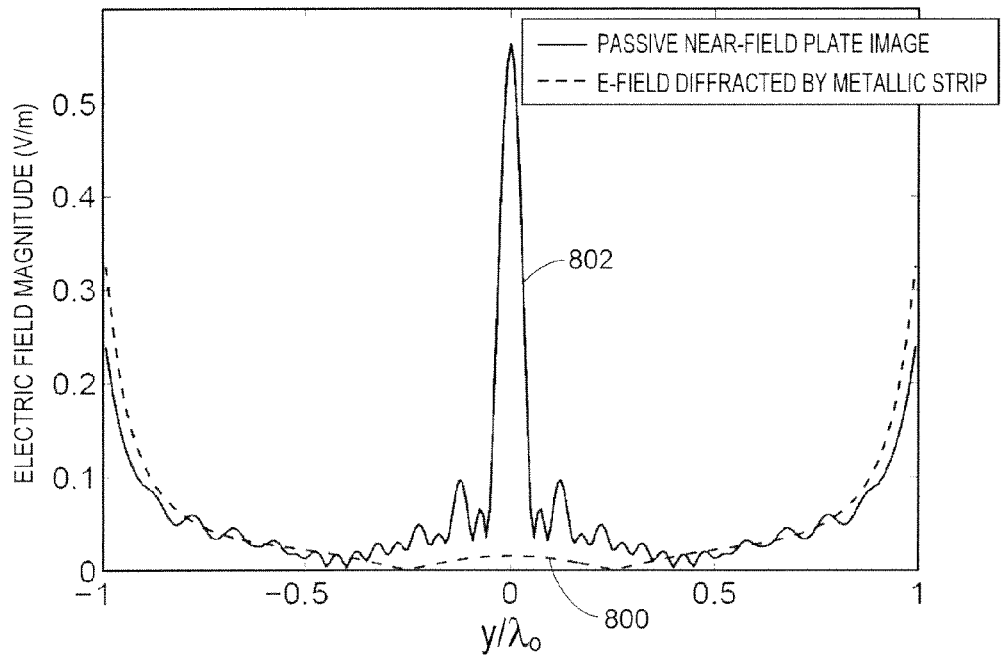
Figure 9:
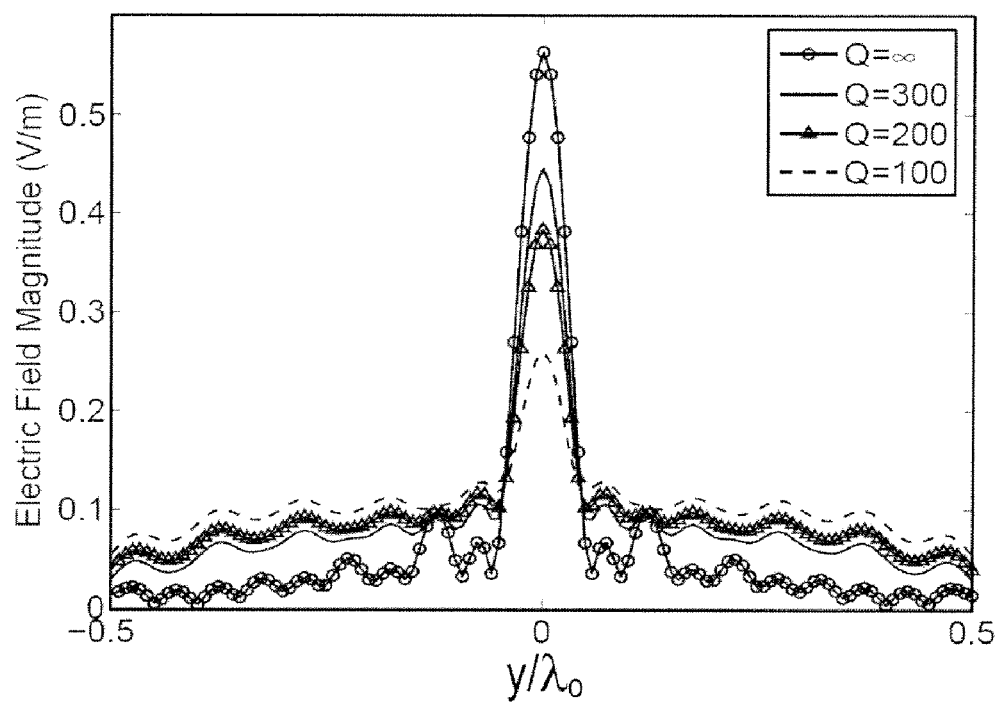

Plotted in FIGS. 7-9 are different electric field profiles at the focal plane of this near-field focusing plate operating in the microwave region. In FIG. 7, for example, dotted line 700 shows the theoretically predicted focus. This theoretically predicted focus is simply a plot of Eq. (12) multiplied by the constant $K_o=6$. A dash-dot line 702 represents the focus that would be produced by the near-field plate possessing the surface impedances given in column 2 of Table I. This active near-field lens possesses reactances as well as positive (loss) and negative (gain) resistive elements. Finally, a solid line 704 represents the focus formed by the passive near-field focusing plate. The active and passive plate foci have a main-lobe that is $\Delta y=\lambda/10$. The difference between the two foci is minimal and they are both quite close to the theoretically predicted focus 700 (dotted line). The foci of the active 702 and passive 704 plates, however, possess an increase in field magnitude near $y=\pm 1\lambda$. This rise in field magnitude is actually due to the diffraction of the incident plane wave from the edges of the near-field focusing plate.

FIG. 8 compares an electric field 800 diffracted by a metallic strip that is two wavelengths wide to an electric field 802 diffracted by the near-field plate of the same width. As can be seen from the plot, the electric field diffracted by the metallic strip follows the field diffracted by the near-field focusing plate near $y=\pm 1\lambda$. This plot confirms the fact that the rise in field is due to diffraction. On the other hand, the electric field around $y=0$ is quite different since the near-field focusing plate manipulates the evanescent spectrum to create a sharp focus, while the metallic strip does not.

Near-field focusing degrades with increased losses. In order to study the performance of a practical near-field focusing plate, loss was added to the purely reactive surface impedances of the passive plate given in column 3 of Table 1. The loss associated with a reactance is typically expressed in terms of quality factor (Q). A quality factor is defined as the ratio of the surface reactance $X_{sheet}$ (imaginary surface impedance) to the surface resistance $R_{sheet}$ (real surface impedance):

$$Q = \frac{X_{sheet}}{R_{sheet}} = \frac{\text{imag}(Z_{sheet})}{\text{real}(Z_{sheet})} \quad (26)$$

FIG. 9 shows the focus for example near-field plates for various quality factors. For each graph, all surface impedances were assigned the same quality factor. The plots show that the central peak of the focus decreases and the sidelobes increase with increasing loss. The degradation of the focus is gradual. For a printed metallic near-field focusing plate at frequencies of a few gigahertz, quality factors of a couple hundred can be expected. For such quality factors, the near-field focusing is still very prominent with a central peak comparable to the amplitude of the incident plane wave.

Example implementations of microwave sub-wavelength scale focusing have been discussed. However, the present techniques may be used for sub-wavelength focusing at other wavelengths, including optical wavelengths, e.g., far infrared, near infrared, visible, and ultraviolet. Merely by way of convention and not limitation, incident radiation within the radio frequency (RF), microwave and millimeter-wave spectral regions is considered to include the frequency region of 100 Hz-300 GHz; incident radiation within infrared spectral region is considered to include the wavelength region of 0.8-1000 μm in wavelength; incident radiation within an optical spectral region is considered to include the wavelength region of 400-800 nm in wavelength; and incident radiation within the Terahertz spectral region is considered to include the frequency region of 300 GHz-3 THz in frequency. Incident radiation within the ultraviolet spectral region is considered to include the wavelength region of 400-200 nm in wavelength.

Fabrication techniques are available for micron and submicron (including nano-) lithography. Therefore, a variety of different focusing structures (Bessel structures, grating like linear structures, etc.) and dimensions may be fabricated to create sub-wavelength near-field focusing over any desired frequency region of interest.

At radio frequencies (RF), inductive surface impedances could be implemented as inductively loaded metallic strips/wires, while the capacitive surface impedances could be implemented as capacitively loaded strips or metallic patches printed on a microwave substrate. At infrared and optical frequencies, the inductive surface impedances could be implemented using nanofabricated plasmonic structures and the capacitive surface impedances using dielectric structures.

Figure 10:
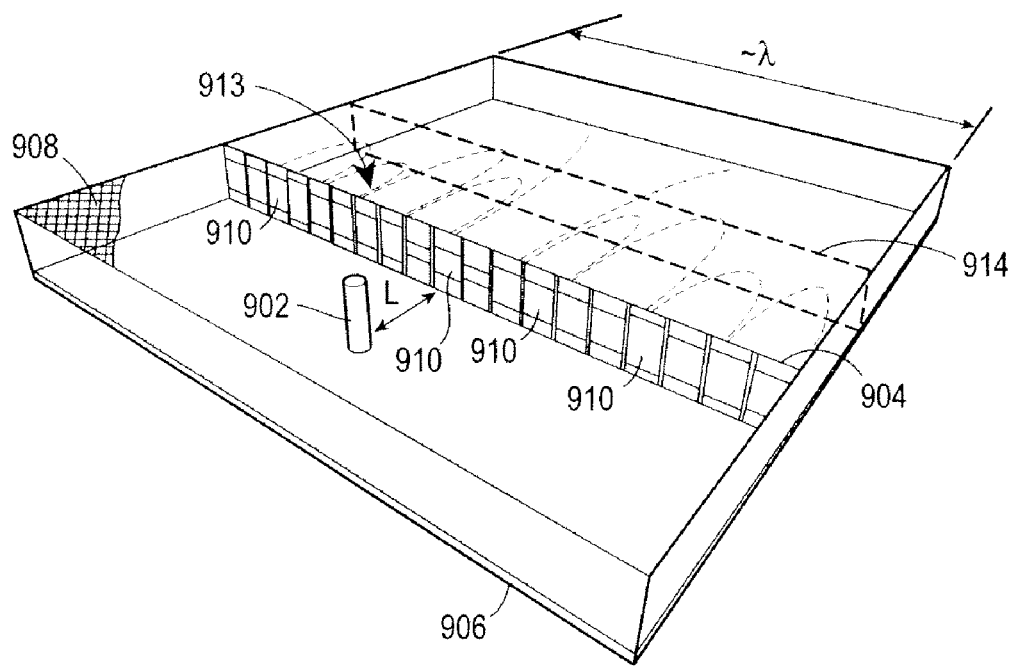
FIG. 10 illustrates an example planar structure for performing sub-wavelength near-field focusing.
Figure 11:
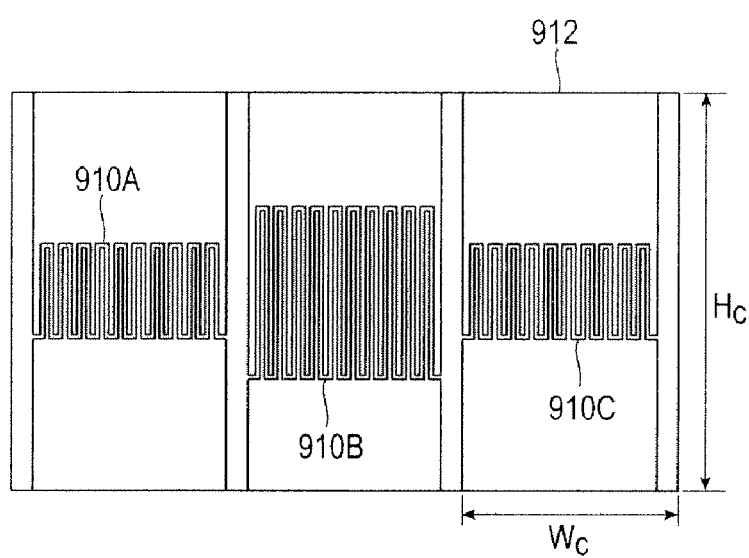
FIG. 11 illustrates three capacitive elements forming a portion of the planar structure of FIG. 10.

An example of a near-field sub-wavelength focusing apparatus 900 is shown in FIG. 10. The apparatus 900 includes a coaxially fed dipole antenna 902 that is a cylindrical light source. A near-field plate 904 is positioned between parallel-plates 906 and 908 forming a planar waveguide. The top ground plane 908 has been removed for clarity. The near-field plate 904 includes an array of interdigitated capacitive elements 910 printed on an electrically thin microwave substrate 912. Extending from the near-field plate 904 is a contour plot of a simulated electric field 913 on the focusing side (logarithmic scale). A dashed line denotes a near-field focal plane 914. The three central capacitive elements 910A-910C of the near-field plate are shown in FIG. 11; Hc=15.0 mm, Wc=7.5 mm.

The electric field 913 depends on the coordinates y (parallel to the plate) and z (normal to the plate) but does not vary in the x direction (the direction of field polarization, parallel to the antenna). As discussed above, an aperture field of the form $F(y,0)=M(y)e^{iq_0 y}$ can focus in the near field, where f(y, z=0) is the aperture field, M(y) is a function that has one or more poles with nonzero components in the spatial complex plane, i is the imaginary unit, and $q_0$ is a constant related to the resolution $\Delta y$ through $\Delta y \sim 2\pi/q_0$.

In the case where M(y) has a single pole, its imaginary component defines the focal length. The aperture field we consider here is given by Eq. (16) which produces a near-field focal plane pattern (z=L) in the form of Eq. (12), which has a null-to-null beamwidth of $\Delta y = 2\pi/q_0$.

Figure 13:
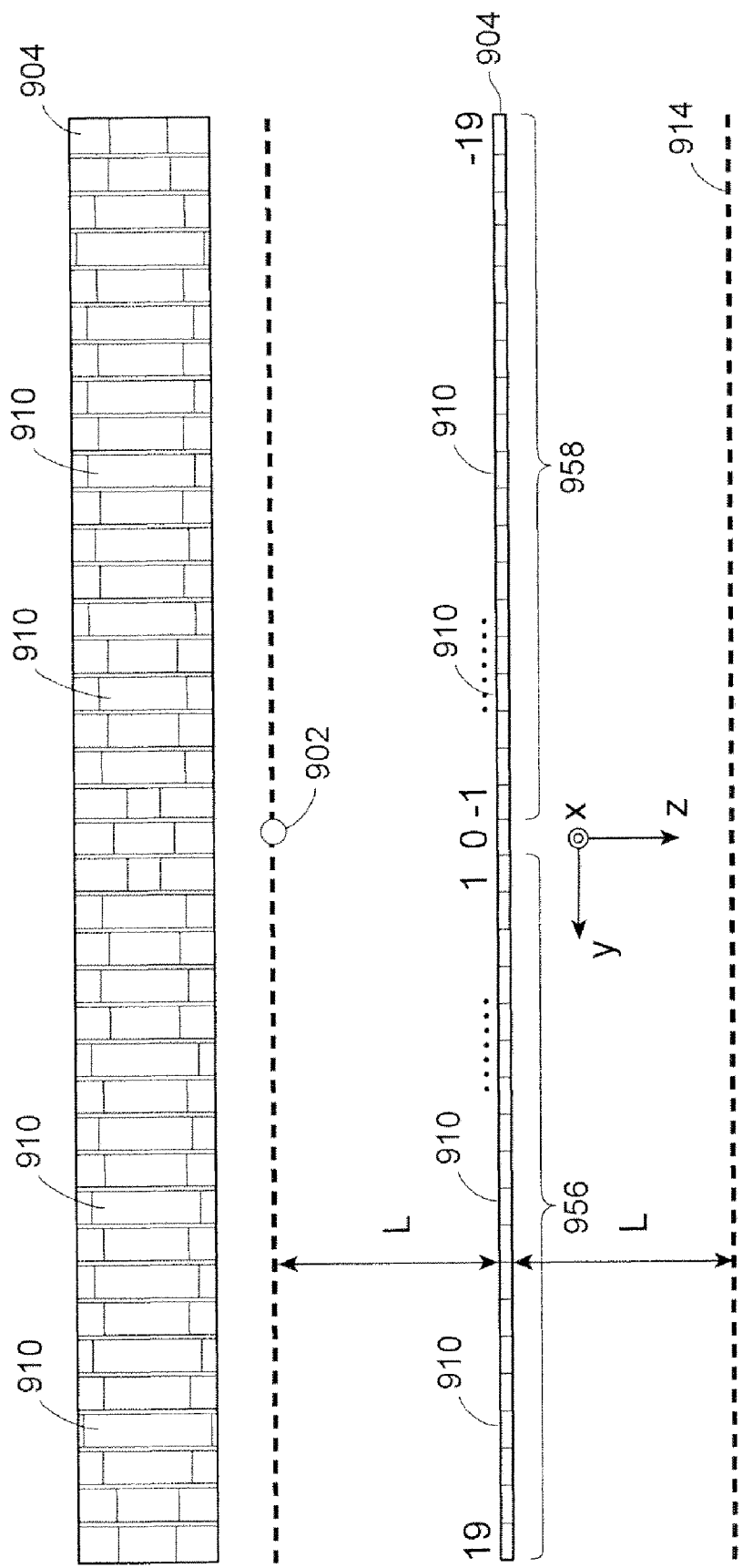
FIG. 13 illustrates a plan view of the planar structure of FIG. 10 at a reference plane, an antenna radiation source, and the near-field focal plane.

A passive near-field plate was then designed to produce the focus given by Eq. 12. Specifically, the designed near-field plate focuses the field emanating from s-polarized, electric field components $E_y=E_z=0$, cylindrical source 902 oscillating at 1.027 GHz to a sub-wavelength focus with a full width at half maximum (FWHM) of λ/18. This value should be compared with λ/2.78 for the diffraction-limited case. The positions of the focal plane 914 and antenna 902 were both chosen to be at a distance of L=λ/15 from the near-field plate, as shown in FIG. 13.

In accordance with image theory, the top and bottom ground planes 906 and 908 act as mirrors and make the finite-height near-field plate 904 and the source 902 appear as though they were infinite in the x direction. The microwave source 902 used in the experiments was a coaxially fed thin wire dipole antenna, which acted as a vertical line current. The outer conductor of the coaxial feed was attached to the bottom ground plane 906, whereas the center conductor, which acted as the dipole antenna, was attached to the top ground plane 908. The width of the near-field plate 902, in the y direction, was chosen to be roughly one free-space wavelength: W=292.2 mm.

The current density on the near-field plate was obtained from the aperture field $E_{total}$ (Eq. 24), by numerically evaluating the integral equation which represents the boundary condition at the surface of the near-field plate 904. Here, $\eta_0=120\pi$ ohms is the wave impedance of free space, $k_0=2\pi/\lambda$, $J_x$ is the current density on the plate, $K_0$ is an amplification factor, and $E_{inc}(y)$ is the electric field incident on the near-field plate from the antenna:

$$E_{inc}(y) = \frac{k_0 \eta_0 I_x}{4} H_0^{(2)}(\sqrt{y^2 + L^2}) \quad (27)$$

where $I_x$ is the current amplitude of the antenna and $H_0^{(2)}$ is the zeroth-order Hankel function of the second kind (a time-harmonic progression of $e^{i\omega t}$ is assumed, where ω is the radial frequency and t is the time). The desired surface impedance, $\eta_{sheet}$, was found by taking the ratio of the aperture field to the current density: $\eta_{sheet}(y)=E_{total}(y)/J_x(y)$.

Figure 12:
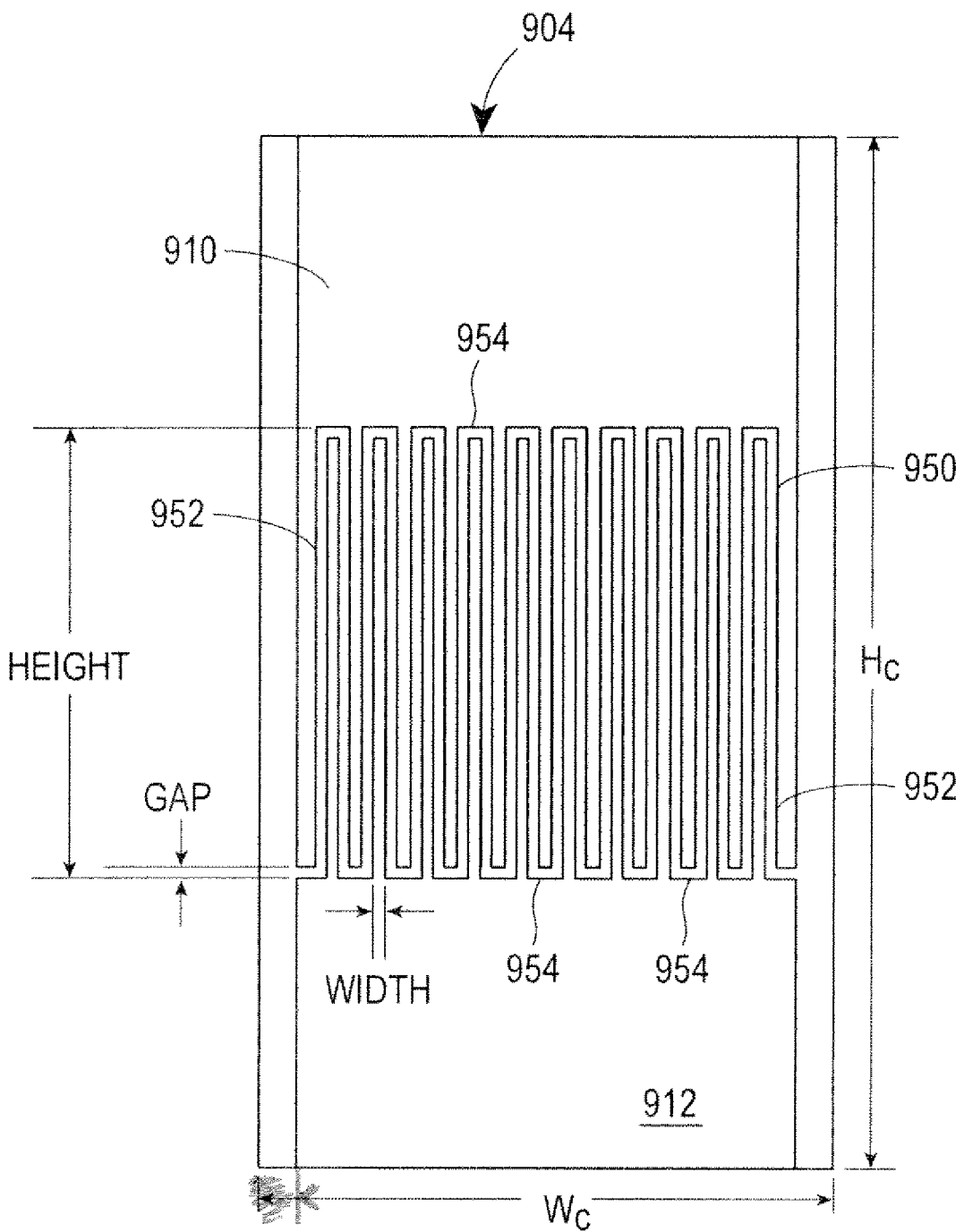
FIG. 12 illustrates more details of one of the three capacitive elements of FIG. 11.

For this particular near-field plate design, the amplification factor was set to $K_0=2$ and $q_0=10$ $k_0$ to yield a resolution of ≈λ/20. To emulate a continuously varying surface impedance, we discretized the plate into n=39 separate elements of width $W_c \approx \lambda/40$ and height $H_c \approx \lambda/20$ (FIGS. 11 and 12). We determined the impedance of each element ($Z_{sheet}$) using the properly normalized surface impedance ($\eta_{sheet}$) evaluated at the center of each strip from Eq. 24: $Z_{sheet}(n)=\eta_{sheet}(n) H_c/W_c$. The impedance elements found through this procedure are all capacitive (15). This was expected, given that the mutual impedance matrix defining the electromagnetic interaction between the impedance elements is predominantly inductive for s-polarized radiation. These inductive mutual impedances resonate with the capacitive impedances $Z_{sheet}$ and result in an aperture field that is $K_0=2$ times higher in amplitude than the field incident on the plate.

The near-field plate 902 was implemented as an array of interdigitated copper capacitors 910A-910C printed on an electrically thin microwave substrate 916, as shown in FIGS. 11 and 12. Each capacitive element 910A-910C, for example, has a different height, each with the same thickness, $W_C$. The operating frequency of the fabricated near-field plate was 1.027 GHz, which was 2.7% higher than the design frequency of 1.0 GHz. This frequency difference is consistent with tolerances associated with the fabrication of the near-field plate, as well as with variations in the parallel-plate waveguide height in which it was tested.

FIG. 12 illustrates an expanded portion of the near-field plate 904, in particular showing one capacitive element 910 formed of a conductive pattern 950 on a substrate 912. The pattern 950 has a height that will typically be different than the heights of adjacent capacitive elements. Longitudinal beams 952 extending along the height, connected in an interdigital pattern by cross beams 954, such that the longitudinal beams 952 are spaced from each other by a width as shown. A gap distance defines the thickness of the cross beams 954. The longitudinal width, $W_C$, of the pattern 950 may be determine by equations provided herein, the same for the height, $H_C$, of the element 910.

FIG. 13 shows the near-field plate 904 showing all 39 (+19 to −19) capacitive elements 910 in a front end view and the orientation of that plate 904 a distance L from the antenna 902 and the same distance L from the focal plane 914, in a plan view. It is noted that in other configurations a distance L' from a radiation source to a near-field plate may be any length, i.e., larger, smaller or equal to the wavelength of the incident radiation, while the distance L from a focal plane to the near-field plate is still less than that wavelength. As shown in FIG. 13, the elements 910 extend in a non-periodic manner in the positive y direction and negative y direction from a central ($0^{th}$ order) element 910B. Although non-periodic in each direction, the portion 956 of the pattern extending in the positive y direction mirrors the portion 958 extending in the negative y direction.

Figure 14A:
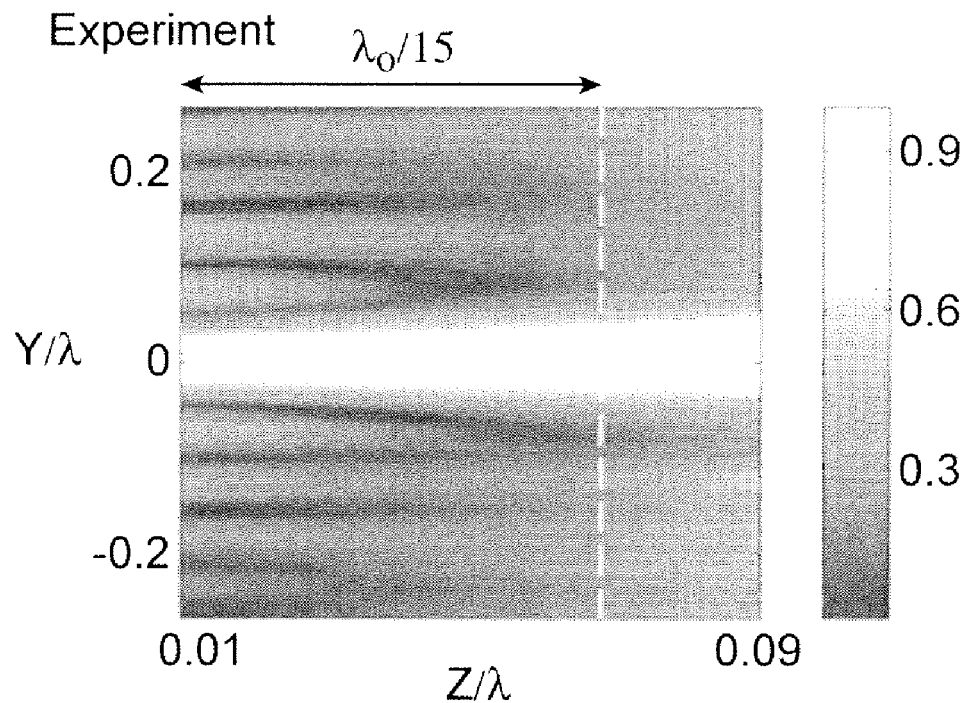
FIGS. 14A and 14B illustrate measured and simulated electric fields propagating from the reference plane to the near-field focal plane.
Figure 14B:
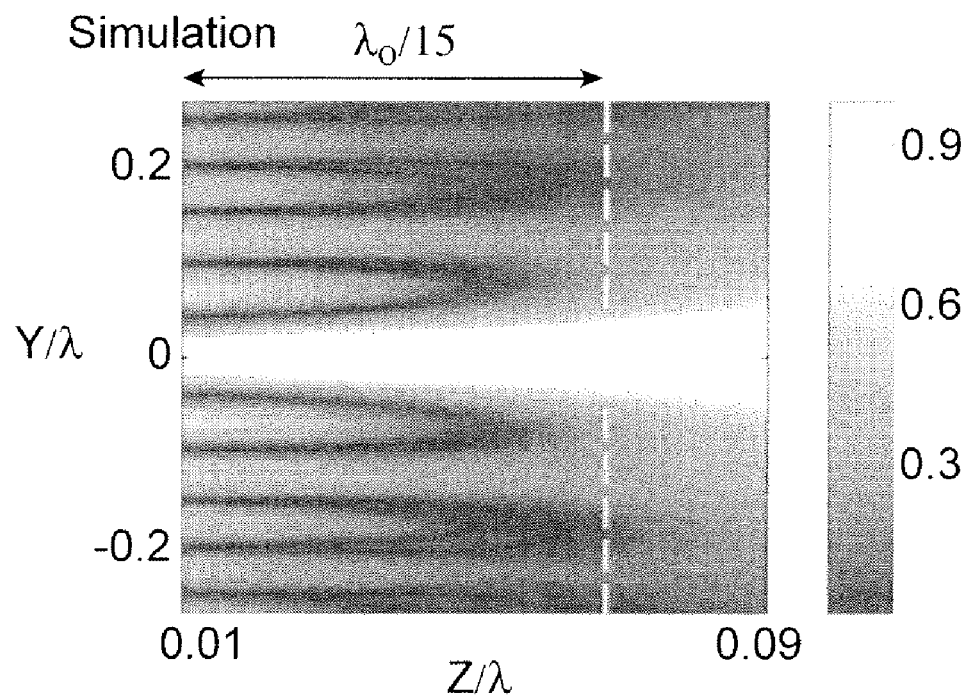
Figure 14C:
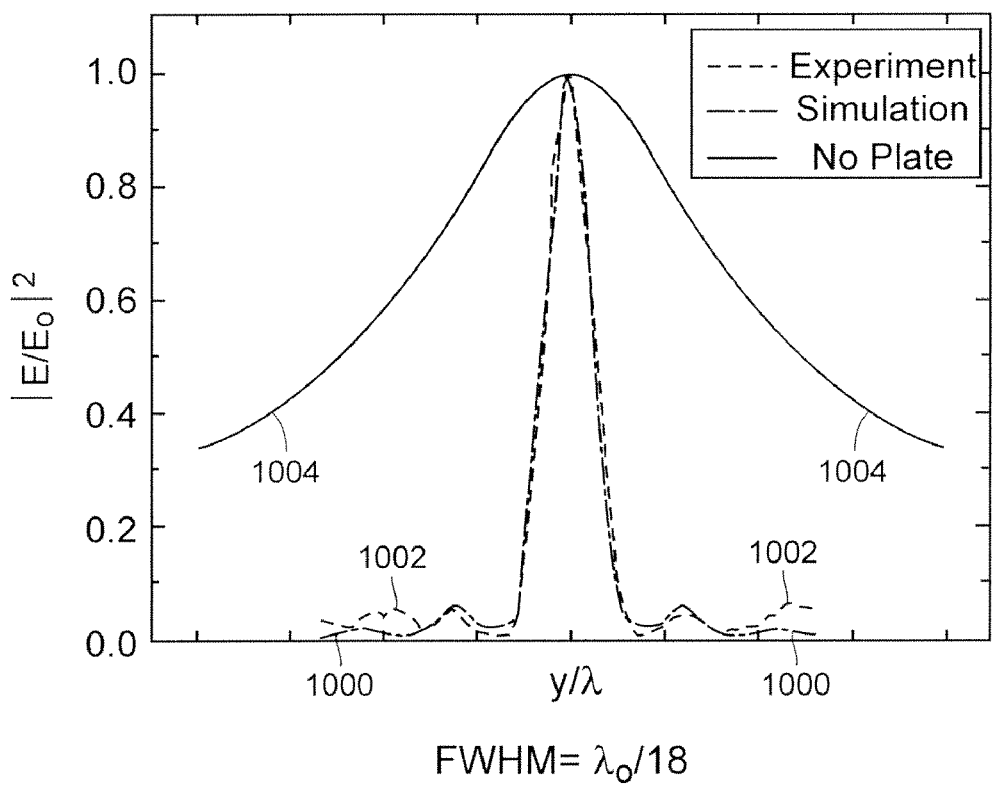
FIG. 14C is a plot comparing the simulated and measured electric field intensities at the near-field focal plane.

FIGS. 14A and 14B show contour plots of the experimental and calculated electric field at the operating (1.027 GHz) and design (1.0 GHz) frequencies, respectively. The electric field amplitude has been normalized to its largest value at a given z. The plots show very good agreement between the measurements and finite element computations, which took into account all electromagnetic interactions as well as the losses associated with the finite conductivity of the capacitors. The relative magnitude of the electric field contour is the same for both plots, and the minima and maxima of the highly oscillatory field between the plate and focal plane show very good agreement between the simulation and the experiment. FIG. 14C compares simulated 1000 and measured 1002 electric field intensities along the focal plane 914, located roughly at $\lambda/15$ (2.0 cm) from the near-field plate 904. The main peaks in the two plots exhibit a FWHM of $\lambda/18$. Fourier transforming the experimental focus reveals that it is composed of spatial frequencies in the range $-10 k_0 < k_y < 10 k_0$. To emphasize the narrowness of the focus, an additional curve 1004 is plotted illustrating what the beamwidth of the electric field would be if the near-field plate 904 were not present. The resolution (FWHM of the focus) was found to decrease from its best value of $\lambda/20.0$ at 1.025 GHz to $\lambda/9.3$ at 1.065 GHz (15). At frequencies below 1.025 GHz, the focal pattern exhibited multiple peaks.

Given that near-field plates provide strong spatial confinement of electromagnetic waves, they hold promise for near-field sensor and microscopy applications, as well as nonradiative wireless power transference and beamshaping millimeter-wave and optical devices.

Near-field plates forming extreme sub-wavelength focuses may be used to develop high resolution probes for near-field microscopy systems. Examples of conventional near-field probes include tapered waveguide apertures and metallic and dielectric tips. Unlike conventional probes, the spatial spectrum of the focus can be easily manipulated, because it is determined by the plate's patterned surface. Moreover, near-field plates offer a larger operating distance (a depth of focus).

The extended spatial spectrum provided by standard near-field probes is only available very close to the small tip or aperture, as a result of the strong divergence of the radiation. In contrast, near-field plates expand the region of the extended spatial spectrum to a length scale, which is, in practice, comparable to that of the resolution. Finally, we note that, similar to slabs with negative material parameters and metallic tips, near-field plates can resonantly amplify the field at the plate's surface and therefore at its focal plane.

In the microwave frequency region, near-field focusing plates may be applied as probing devices for non-contact sensing; focusing or beam-shaping devices for quasi-optical systems; antenna designs with various aperture illuminations generated by exploiting near-field resonances; and non-radiative power transfer devices based on near-field plates, with possibly improved coupling efficiency and extended power transfer distances.

For wireless non-radiative power transfer applications, such as those discussed A. Kurs et al. "Wireless Power Transfer via Strongly Coupled Magnetic Resonances," Science, 317, pp. 83-86, July 2007, manipulation of the near-field becomes important since both the source and wireless load are within each other's near-field. Near-field plates consisting of arrays of sub-wavelength resonant loops may offer a planar, low profile alternative to the resonant coils used in conventional experimental demonstrations of nonradiative power transfer. The near-field plates' ability to manipulate the near-field may also provide improved coupling efficiency and extended power transfer distances.

Near-field plates may be integrated into quasi-optical and optical systems as focusing or beam-shaping elements. For example, an incident beam could be focused to narrow (sub-wavelength) spots (waists) prior to entering a millimeter-wave, THz, infrared or optical device. In this way, the size of system components could be significantly reduced. By way of example, such focusing elements may be used in energy scavenging systems or as light concentrators in infrared or optical detector arrays.

As described above, near-field plates can also be employed as beam-shaping devices. For instance, a Gaussian or Bessel beam could be generated from a point source illumination using such the planar structure development techniques described above.

Applications such as near-field microscopy, near-field optical data storage, beam shaping, and lithography may be employed, because of the advantageous high resolution (sub-wavelength) operation of near-field plates. Such applications can be used in the Terahertz and optical frequency regions, as well as the other spectral regions described herein. For the data storage, for example, the ability to create sub-wavelength spot sizes may be used with magnetic elements, which have already been developed in the sub-micron region. As a source probe, sub-wavelength near-field focusing could produce sub-micron heating of magnetic elements (i.e., nano-heating) for writing and erasing.

For imaging applications, the availability of sub-micron and sub-nanometer (e.g., 500 Angstrom) feature fabrication techniques will allow sub-wavelength imaging at arbitrarily small resolutions. Even at microwave applications, traditional cm scale spot sizes can be reduced to mm scale (approx. 1 mm) for increased resolution.

Other applications include antenna and nano-antenna systems. Near-field focusing plates can be used in antenna development at microwave frequencies as well as infrared and optical frequencies (nano-antennas). For example, a near-field plate may designed to generate a plane wave from a sub-wavelength light source to collimate the electromagnetic field from a closely placed source. The exciting source and radiator (near-field plate) would be very close to each other or even in the same plane, producing a high gain, low profile antenna design with high aperture efficiency. In addition, the mutual interaction of the elements comprising the near-field plate may in fact give rise to larger bandwidths, as is in coupled resonators. Control over the phase and amplitude of the various currents on the plate could be effectively controlled through near-field resonances, given that large numbers of elements are in each others near-field. One particular application would be with respect to super-directive far-field antennas. Similar to super-directive antennas, adjacent elements comprising a near-field plate exhibit large and oppositely directed currents. Even moderate amounts of far-field super-directivity using near-field plates may be used in microwave antenna systems as well as optical systems, for example, to compensate for the beam divergence of lasers.

In any event, generally, various applications for the techniques herein will be apparent upon reading this disclosure.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). This includes not only the determinations for determining a sub-wavelength pattern on a planar structure, but also with respect to communication that determination to a fabrication system for implementation. When implemented in hardware, the hardware may comprise one or more of discrete components, an integrated circuit, an application-specific integrated circuit (ASIC), etc. In some examples, a single computer or network of computers may determine the desired sub-wavelength pattern for the planar structure and then communicate the same as general instructions to a fabrication process (e.g., including an wired or wireless connected interfacing computer controlling an entire fabrication manufacturing process, examples of which are discussed hereinabove). The instructions may be naked in that the fabrication process must convert the instructions into those compatible with the particular fabricating machinery or processes (e.g., lithography, milling, a sub-wavelength fabrication unit). Or in other examples, the computer determining the sub-wavelength pattern may be integrated with the fabrication process itself.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for sub-wavelength focusing an incident radiation comprising:
    determining a desired field pattern at a focal plane, the pattern having a resolution below a wavelength, $\lambda$, of the incident radiation;
    determining a reference electromagnetic field pattern to produce the desired near-field focus at the focal plane, the reference electromagnetic field pattern being at a reference plane that is at a distance, L, to the focal plane; and
    forming a planar structure at the reference plane, the planar structure having a sub-wavelength pattern that under illumination by the incident radiation forms the reference electromagnetic field pattern.

2. The method of claim 1, wherein determining the reference electromagnetic field pattern comprises back propagating the desired focal pattern from the focal plane to the reference plane through a phase reversal process for propagating electromagnetic waves and an amplitude restoration process for evanescent waves.

3. The method of claim 2, further comprising:
    determining a current density profile capable of producing the reference electromagnetic field pattern at the reference plane; and
    determining the sub-wavelength pattern by determining a ratio of the reference electromagnetic field pattern to the current density profile.

4. The method of claim 1, wherein the sub-wavelength pattern forms a surface impedance profile, the method further comprising forming the planar structure as a plurality of capacitive and inductive elements, such that the sub-wavelength pattern of the planar structure varies with transverse position (x and y directions) orthogonal to a normal (z) axis extending along the direction of propagation of the incident light.

5. The method of claim 4, further comprising:
    forming each of the plurality of capacitive and inductive elements from printed or lumped elements or lithographically; and
    coupling the plurality of capacitive and inductive elements together in a non-periodic configuration, such that adjacent elements have different reactances.

6. The method of claim 1, wherein the sub-wavelength pattern forms a surface permittivity profile, the method further comprising forming the planar structure as a plurality of dielectric and plasmonic elements, such that the sub-wavelength pattern of the planar structure varies with transverse position (x and y directions) orthogonal to a normal (z) axis extending along the direction of propagation of the incident light.

7. The method of claim 6, further comprising:
    forming each of the plurality of dielectric and plasmonic elements from printed or lumped elements or lithographically; and
    coupling the plurality of dielectric and plasmonic elements together in a non-periodic configuration, such that adjacent elements have different permittivities.

8. The method of claim 1, further comprising forming the planar structure as a modulated, non-periodic surface reactance or permittivity modulation.

9. The method of claim 1, further comprising illuminating the planar structure with the incident radiation from a plane wave radiation source.

10. The method of claim 1, further comprising illuminating the planar structure with an incident wave from a cylindrical electromagnetic source spaced from the reference plane by the distance L' in a negative z direction, wherein the radiation source is spaced from the focal plane by the distance L'+L in a positive z direction.

11. The method of claim 10, wherein L is less than $\lambda$.

12. The method of claim 1, wherein the incident radiation is within a radio frequency (RF), microwave and millimeter-wave spectral regions.

13. The method of claim 1, wherein the incident radiation is within an infrared spectral region.

14. The method of claim 1, wherein the incident radiation is within an optical spectral region.

15. The method of claim 1, where the incident radiation is within an ultraviolet spectral region.

16. The method of claim 1, further comprising forming the planar structure comprising a plurality of parallel elements each extending linearly along an axis of polarization of an incident radiation.

17. The method of claim 1, further comprising forming the planar structure comprising a modulated grating pattern comprising a plurality of concentric rings or a two-dimensional array of electromagnetic scatterers.

18. The method of claim 1, further comprising forming the planar structure having elements having a cylindrical symmetry to produce a sub-wavelength line in the desired field pattern at the focal plane.

19. The method of claim 1, further comprising forming the planar structure having elements having an azimuthal symmetry to produce a sub-wavelength spot in the desired electromagnetic field pattern at the focal plane.

20. The method of claim 1, wherein the desired electromagnetic field pattern at the focal plane has a resolution, l, where $l=2\pi/|q_0|$, where $q_0$ is the highest spectral frequency of the planar structure.

21. An apparatus for sub-wavelength focusing an incident radiation at a wavelength, $\lambda$, from a radiation source, the apparatus comprising a planar structure having a sub-wavelength pattern that under illumination by the incident radiation forms a reference electromagnetic field pattern that after propagating a near-field distance, L, forms a desired field pattern at a near-field focal plane, where the desired field pattern has a resolution below, $\lambda$, and where L is below $\lambda$.

22. The apparatus of claim 21, wherein the sub-wavelength pattern forms a surface impedance profile comprising a plurality of capacitive and inductive elements, such that the sub-wavelength pattern varies with transverse position (x and y directions) orthogonal to a normal (z) axis extending along the direction of propagation of the incident light.

23. The apparatus of claim 22, further wherein the plurality of capacitive and inductive elements form a non-periodic configuration, such that adjacent elements have different reactances.

24. The apparatus of claim 21, wherein the sub-wavelength pattern forms a surface permittivity profile comprising a plurality of dielectric and plasmonic elements, such that the sub-wavelength pattern varies with transverse position (x and y directions) orthogonal to a normal (z) axis extending along the direction of propagation of the incident light.

25. The apparatus of claim 24, further comprising wherein the plurality of dielectric and plasmonic elements form a non-periodic configuration, such that adjacent elements have different permittivities.

26. The apparatus of claim 21, wherein the planar structure has a modulated, non-periodic surface reactance or permittivity modulation.

27. The apparatus of claim 21, wherein the planar structure comprises a plurality of parallel elements each extending linearly along an axis of polarization of an incident radiation.

28. The apparatus of claim 21, wherein the planar structure comprises a modulated grating pattern comprising a plurality of concentric rings or a two-dimensional array of electromagnetic scatterers.

29. The apparatus of claim 21, wherein the planar structure comprises elements having a cylindrical symmetry to produce a sub-wavelength line in the desired field pattern at the focal plane.

30. The apparatus of claim 21, wherein the planar structure comprises elements having an azimuthal symmetry to produce a sub-wavelength spot in the desired electromagnetic field pattern at the focal plane.

31. The apparatus of claim 1, wherein the desired electromagnetic field pattern at the near-field focal plane has a resolution, l, where $l=2\pi/|q_0|$, where $q_0$ is the highest spectral frequency of the planar structure.

32. The apparatus of claim 21, wherein the incident radiation from the radiation source is at the wavelength, $\lambda$, within a radio frequency (RF), microwave and millimeter-wave spectral region.

33. The apparatus of claim 21, wherein the incident radiation from the radiation source is at the wavelength, $\lambda$, within an infrared spectral region.

34. The apparatus of claim 21, wherein the incident radiation from the radiation source is at the wavelength, $\lambda$, within an optical spectral region.

35. The apparatus of claim 21, wherein the incident radiation from the radiation source is at the wavelength, $\lambda$, within an ultraviolet spectral region.

* * * * *